(12) United States Patent
Mason et al.

(10) Patent No.: US 12,734,967 B2
(45) Date of Patent: Sep. 15, 2026

(54) PIVOTING STAIRCASE

(71) Applicant: MORRYDE INTERNATIONAL, INC., Elkhart, IN (US)

(72) Inventors: Ryan Mason, Niles, MI (US); Anthony J. Granzotto, Constantine, MI (US); Gary E. Tompkins, Mishawaka, IN (US); David Soetaert, South Bend, IN (US); Ben Kauffman, Goshen, IN (US)

(73) Assignee: MORRYDE INTERNATIONAL, INC., Elkhart, IN (US)

( * ) Notice: Subject to any disclaimer, the term of this patent is extended or adjusted under 35 U.S.C. 154(b) by 325 days.

(21) Appl. No.: 18/124,384

(22) Filed: Mar. 21, 2023

(65) Prior Publication Data

US 2023/0294607 A1 Sep. 21, 2023

Related U.S. Application Data

(60) Provisional application No. 63/322,021, filed on Mar. 21, 2022.

(51) Int. Cl.
*B60R 3/00* (2006.01)

(52) U.S. Cl.
CPC .................................... *B60R 3/007* (2013.01)

(58) Field of Classification Search
CPC ........ B60R 3/007; E04F 11/06; E04F 11/062; E04F 11/066; E04F 11/1041; E04F 11/068; E06C 7/08; E06C 7/081; E06C 7/082; E06C 7/084
USPC .................................................... 52/182–191
See application file for complete search history.

(56) References Cited

U.S. PATENT DOCUMENTS 2,551,345 A * 5/1951 Scott ........................ B63B 27/14 105/326
2,622,783 A * 12/1952 Mahoney ................ E04F 11/06 182/89
3,176,334 A * 4/1965 Lovdahl .................... B60R 3/02 14/71.1
3,299,590 A * 1/1967 Lavoy ................. E04F 11/0255 52/183
3,407,901 A * 10/1968 Brammer ................ B60R 3/007 182/206
3,978,628 A * 9/1976 Turner ..................... E04F 11/16 52/190
4,371,055 A * 2/1983 Ashton ................... E06C 7/081 182/194
4,642,953 A * 2/1987 DeGood ................. E04F 11/06 52/185
4,723,631 A * 2/1988 Tremblay ................ E06C 1/387 182/206
4,757,876 A * 7/1988 Peacock .................... E06C 1/52 182/95

(Continued)

*Primary Examiner* — Brian E Glessner
*Assistant Examiner* — Adam G Barlow
(74) *Attorney, Agent, or Firm* — MARSHALL, GERSTEIN & BORUN LLP

(57) ABSTRACT

A pivoting staircase includes a pair of stringers and a tread extending between the stringers. A cleaning opening is defined at least partially by a lateral edge of the tread and a surface portion of an adjacent one of the pair of stringers. The cleaning opening is disposed between a pair of adjacent connection points of the tread and the adjacent one of the pair of stringers to provide a pathway for debris to fall laterally off of the tread.

20 Claims, 20 Drawing Sheets

(56) References Cited

U.S. PATENT DOCUMENTS

| | | | | | |
|---|---|---|---|---|---|
| 5,189,854 | A * | 3/1993 | Nebel | B63B 27/14 | 182/1 |
| 6,012,548 | A * | 1/2000 | Kim | E06C 1/393 | 182/161 |
| 8,776,947 | B1 * | 7/2014 | Wurth | E06C 7/48 | 182/1 |
| 9,771,025 | B1 * | 9/2017 | Nebel | B60R 3/02 | |
| 10,519,671 | B2 * | 12/2019 | Tompkins | B60R 3/02 | |
| 2019/0256005 | A1 * | 8/2019 | Granzotto | B60P 3/34 | |
| 2024/0301752 | A1 * | 9/2024 | Leng | E06C 1/20 | |

* cited by examiner 14
12
100
33
110
107
140
102
110
138
142
104
100
107
102
19
110
140
138
142
138
107
104
18
20

PIVOTING STAIRCASE

CROSS-REFERENCE TO RELATED APPLICATION

This application claims the benefit of U.S. Provisional Application No. 63/322,021, filed Mar. 21, 2022, which is incorporated by reference herein in its entirety.

FIELD OF THE DISCLOSURE

The present disclosure generally relates to staircases for recreational vehicles and, more particularly, to pivoting staircases for recreational vehicles.

BACKGROUND

Pivoting staircases for recreational vehicles (RVs) help users easily enter and exit the RV. Typically, RVs, which can be towable units or motorhomes, are well above the ground upon which they rest. To provide traction for a user and prevent or minimize a user's foot from slipping front-to-back or back-to-front, each of the treads of the staircase can include ribs that extend laterally thereacross. When deployed, dirt and other debris can collect on the treads and, specifically, between the ribs. Due to the lateral configuration of the ribs extending between stringers of the staircase, a user is prevented from being able to easily sweep the treads off prior to pivoting the staircase to a storage position within the RV. Due to this, as the staircase is pivoted to a vertical orientation, dirt and other debris trapped between the ribs undesirably falls onto a floor of the RV. Accordingly, there is a need for a pivoting staircase with treads that can be easily cleaned.

SUMMARY

In accordance with a first implementation, a pivoting staircase is disclosed that includes a pair of stringers and a tread extending between the stringers, where an upper surface of the tread has upstanding ribs extending laterally thereacross. A cleaning opening is defined at least partially by a lateral edge of the tread and a surface portion of an adjacent one of the pair of stringers, and is disposed between a pair of adjacent connection points of the tread and the adjacent one of the pair of stringers to provide a pathway for debris to fall laterally off of the upper surface of the tread.

In some examples, the cleaning opening can be further defined by members spacing the lateral edge of the tread from the surface portion of the adjacent one of the pair of stringers partially defining the cleaning opening. In further examples, the members can be spacers disposed between the tread and the adjacent one of the pair of stringers; and the tread can be secured to the pair of stringers by fasteners at the connection points, the fasteners configured to extend through the spacers; the pivoting staircase can include a spacer member disposed between the tread and the adjacent one of the pair of stringers, where the members are fingers of the spacer member extending from a base portion thereof; and/or the members can be protruding portions of the adjacent one of the pair of stringers, e.g., embossed portions of a wall of the adjacent one of the pair of stringers. In any of the above forms, the members can have a rounded upper surface; and/or the lateral edge of the tread can be planar.

In some examples, the lateral edge of the tread can include extension portions and a concave portion disposed therebetween, where the extension portions are at the connection points between the tread and the adjacent one of the pair of stringers.

In some examples, the lateral edge of the tread can extend along an interior surface of the adjacent one of the pair of stringers and the surface portion of the adjacent one of the pair of stringers partially defining the cleaning opening can be spaced laterally away from the lateral edge of the tread. In further forms, the adjacent one of the pair of stringers can include a tubular body having an interior wall and an exterior wall, where the interior wall defines an opening extending therethrough aligned with the tread and extending above a top surface thereof, and the surface portion of the adjacent one of the pair of stringers partially defining the cleaning opening being a surface of the exterior wall; the adjacent one of the pair of stringers can include a tubular body having an interior wall, an exterior wall, and sidewalls extending between, the interior wall having top and bottom portions extending from the sidewalls with a gap disposed therebetween aligned with the tread, and the surface portion of the adjacent one of the pair of stringers partially defining the cleaning opening being a surface of the exterior wall; the adjacent one of the pair of stringers can include a wall having the interior surface, the surface portion of the adjacent one of the pair of stringers partially defining the cleaning opening being a surface of a cavity formed, e.g., embossed, in the wall; the adjacent one of the pair of stringers can include a wall having the interior surface, the surface portion of the adjacent one of the pair of stringers partially defining the cleaning opening being provided by a deflector of the wall, the deflector having side and top edges defined by cuts extending through the wall and being pivoted about a bottom edge thereof to extend away from the tread; and/or the adjacent one of the pair of stringers can include a wall having the interior surface, the surface portion of the adjacent one of the pair of stringers partially defining the cleaning opening being a surface of a groove formed in the wall and extending a length of the adjacent one of the pair of stringers.

In any of the above examples, the pivoting staircase can include a second cleaning opening defined at least partially by the lateral edge of the tread and a second surface portion of the adjacent one of the pair of stringers, where the second cleaning opening is disposed between a second pair of adjacent connection points of the tread and the adjacent one of the pair of stringers to provide a pathway for debris to fall laterally off of the tread; the pivoting staircase can include an opposite cleaning opening defined at least partially by an opposite lateral edge of the tread and a surface portion of the other one the pair of stringers, the opposite cleaning opening having a mirror configuration to the cleaning opening; and/or a pivot connection coupled to upper ends of the pair of stringers, where the pivot connection is configured to pivotably mount the pivoting staircase to an elevated surface. In further examples, the pivot connection can include a hinge having a floor mounting portion and a mounting plate pivotably connected to the floor mounting portion, the mounting plate coupled to the upper ends of the pair of stringers; or left and right hinges including first hinge flanges coupled to the upper edges of the pair of stringers and second hinge flanges including at least one of a floor mounting portion or a wall mounting portion.

In accordance with a second implementation; a recreational vehicle or trailer is described that includes a floor, a wall extending upwardly from the floor and defining a door opening therein, and a pivoting staircase of any of the above examples.

DETAILED DESCRIPTION

Pivoting staircases are disclosed herein that include one or more lateral openings for the treads to easily sweep away dirt and other debris before pivoting the staircase to a vertical position for storage. The lateral openings can be provided in the treads of the staircase, the stringers of the staircase, or combinations thereof.

Figure 1:
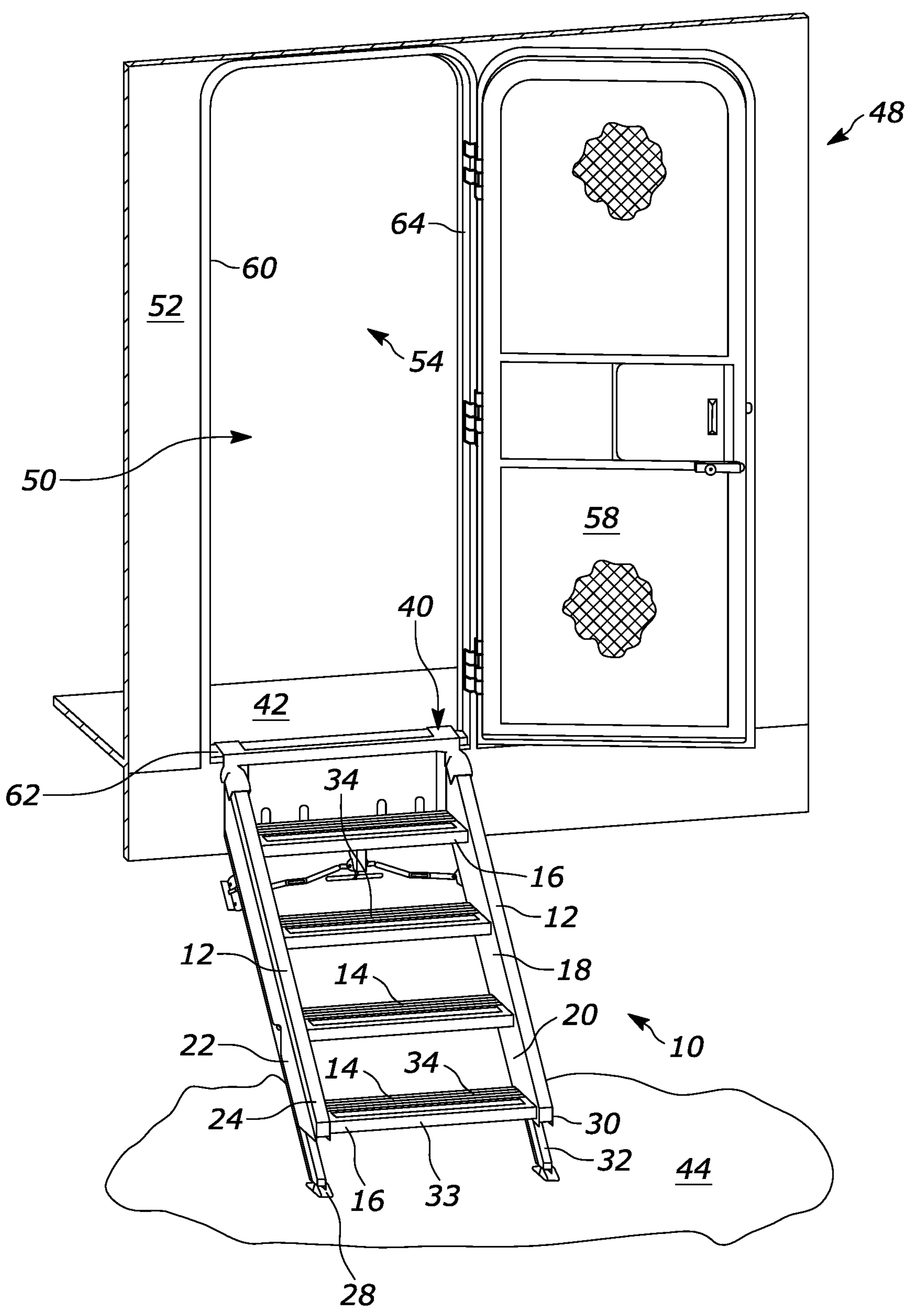
FIG. 1 is a sectional perspective view of a recreational vehicle or trailer having a pivoting staircase in accordance with the teachings of the present disclosure.

An example pivoting staircase 10 is shown in FIG. 1. The staircase 10 includes a pair of stringers 12 that are spaced from and parallel to each other. A number of treads 14 extend between the stringers 12 and have lateral ends 16 thereof fixed to the stringers 12. The staircase 10 can include any suitable number of treads 14, such as two, three as shown, four, five, or more. The treads 14 can be fixed to the stringers 12 in any suitable way. For example, the ends 16 of the treads 14 can be welded to an interior surface 18 of the stringers 12, one or more fasteners 19, such as bolts and screws, can secure the treads 14 to the stringers 12, the treads 14 and stringers 12 can have interlocking components, and so forth.

Figure 24:
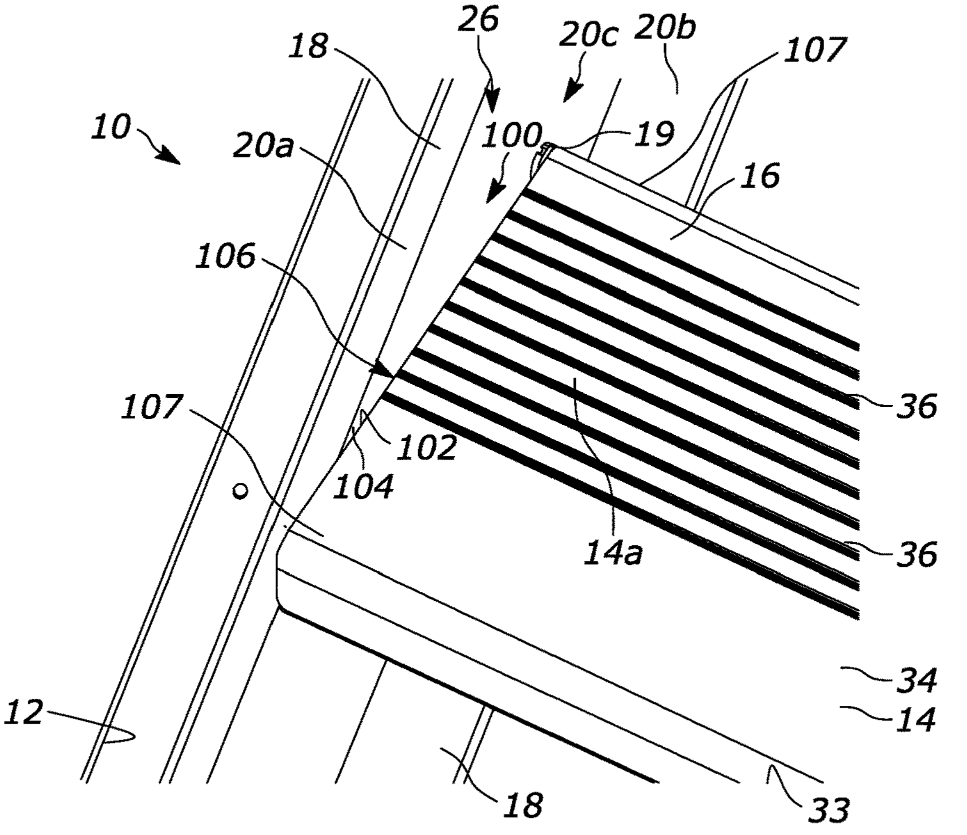
FIG. 24 is a sectional top perspective view of a ninth example cleaning opening for a pivoting staircase defined between a stringer and tread thereof.
Figure 25:
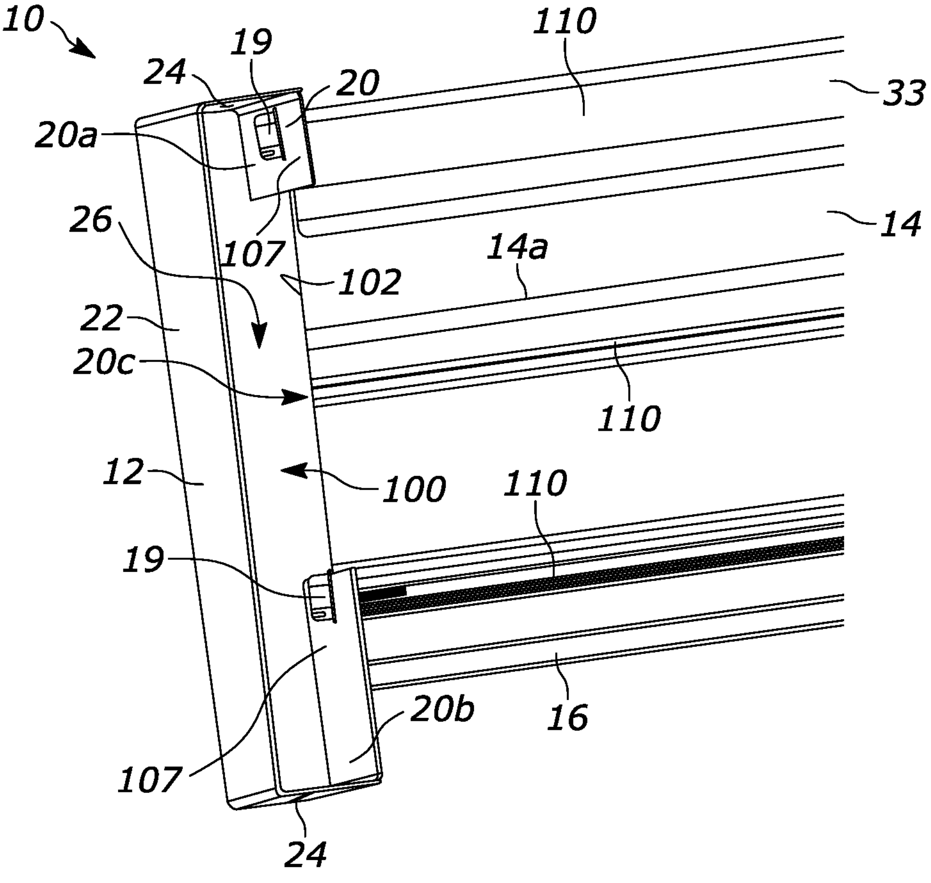
FIG. 25 is a sectional bottom perspective view of the cleaning opening of FIG. 24.

The stringers 12 can have any suitable form. For example, the stringers 12 can include at least a wall 20 to couple to the tread 14. The wall 20 can have a substantially unbroken profile, other than openings extending therethrough for fasteners and other uses, or can be divided into two or more portions connected to other walls or structures. In the illustrated example, the stringers 12 have a tubular configuration with the interior wall 20 providing the interior surface 18 for engaging the treads 14, an exterior wall 22, and sidewalls 24 extending therebetween to define an interior 26 extending the length of the stringers 12. In one form, as shown in FIGS. 24 and 25, the interior wall 20 can be broken into top and bottom portions 20*a*, 20*b* connected to the opposite sidewalls 24 with a gap 20*c* therebetween extending along a longitudinal length of the stringer 12. In this example, the tubular stringer 12 has an inwardly-opening c-shaped configuration. Of course, the exterior wall 22 could have a similar, open configuration with a gap extending the longitudinal length thereof giving the stringer 12 an outwardly-opening c-shaped configuration. In another example, one of the sidewalls 24 could be omitted, giving the stringer 12 an open top or bottom.

In some examples, feet 28 can be coupled to a distal end 30 of the stringers 12, such as pivotably coupled thereto to brace the staircase 10 against a lower surface when deployed. Further, adjustable legs 32 can extend between the feet 28 and the distal ends 30 of the stringers 12. The adjustable legs 32 can be configured to extend and retract to adjust a position of the feet 28 relative to the stringer distal end 30. The adjustable legs 32 can have any suitable configuration, such as telescoping members with a locking mechanism as shown.

The treads 14 include a body 33 having an upper surface 34 upon which a user can step when using the staircase 10. As shown in the figures, the treads 14 can include upstanding ribs 36 that extend laterally between the lateral ends 16 thereof. The treads 14 help provide traction for users when ascending or descending the staircase 10 and, specifically, help prevent a user's foot from slipping in a front-to-back or a back-to-front direction. In some examples, a textured surface 38 can be disposed on, e.g., adhered or coated, or formed in the tread upper surface 34 forwardly of the ribs 36 to provide additional traction for a user.

Figure 2:
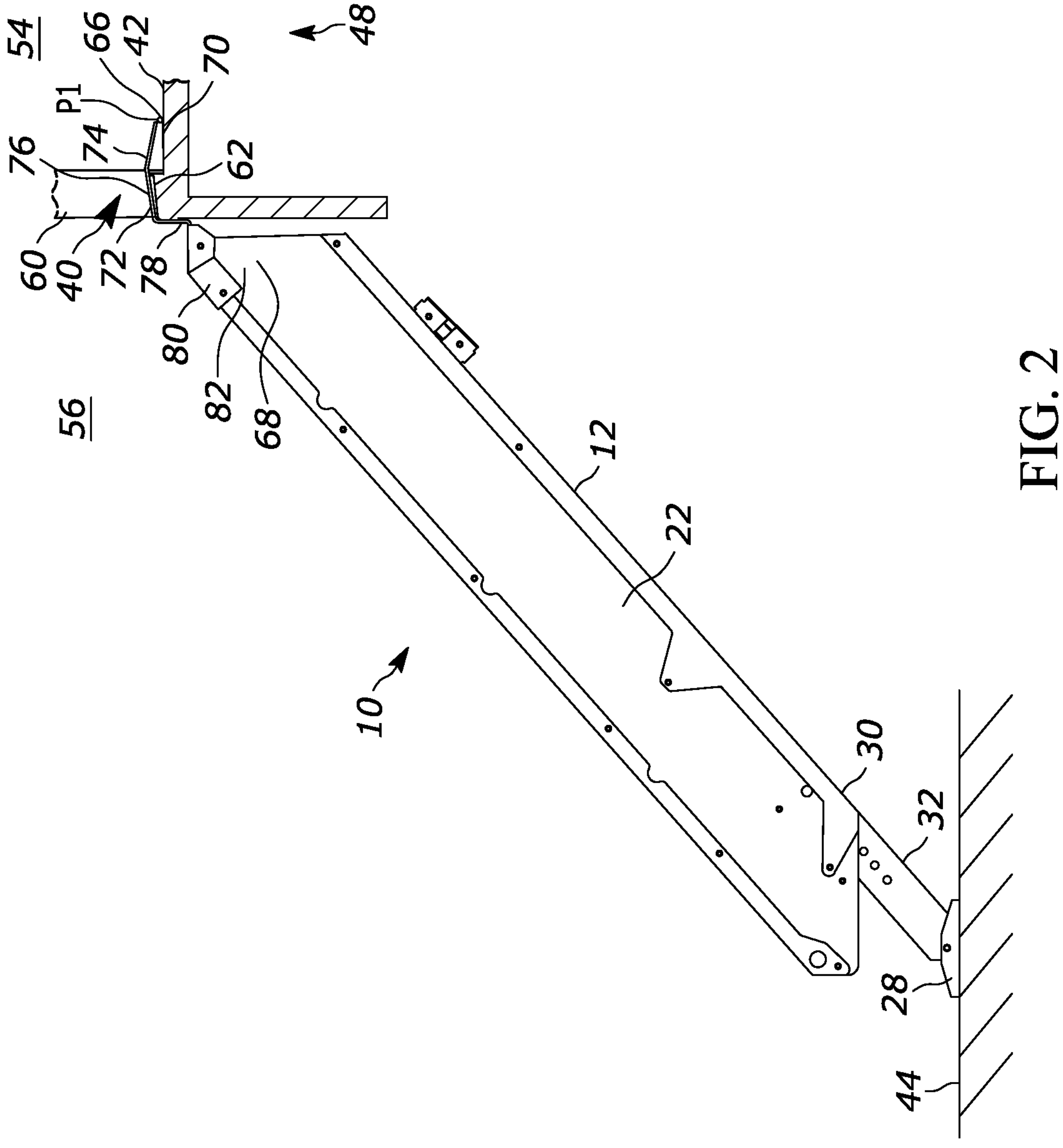
FIG. 2 is a side cross-sectional view of a first pivot connection for a pivoting staircase showing the staircase in a use position.

As shown in FIGS. 1 and 2, the staircase 10 is pivotable between a use position (FIG. 1) and a storage position (FIG. 2) about a pivot connection 40. In the use position, the staircase 10 extends downwardly and forwardly relative to an elevated floor or surface 42 to contact or be disposed adjacent to a lower surface 44, such as the ground. In the use position, the staircase 10 provides access to the elevated floor 42. In the storage position, the staircase 10 is pivoted about the pivot connection 40 to or through a vertical orientation positioned over the pivot connection 40. For example, the staircase 10 can be held in a vertical orientation disposed over the pivot connection 40 or can be pivoted past the vertical orientation to a rearwardly angled or horizontal orientation.

While pivoting staircases 10 can be utilized in a variety of locations, they are particularly useful for recreational vehicles/trailers 48 that are moved between various locations and have elevated floors 42 relative to the ground 44. As shown in FIG. 1, The staircase 10 can be mounted in a door opening 50 within a wall 52 separating an indoor space 54 from an outdoor space 56. The door opening 50 receives a door 58 that is pivotable between an open position as shown in FIG. 1 and a closed position. The door opening 50 includes a door frame 60 having a threshold 62 and vertical door jambs 64.

Figure 3:
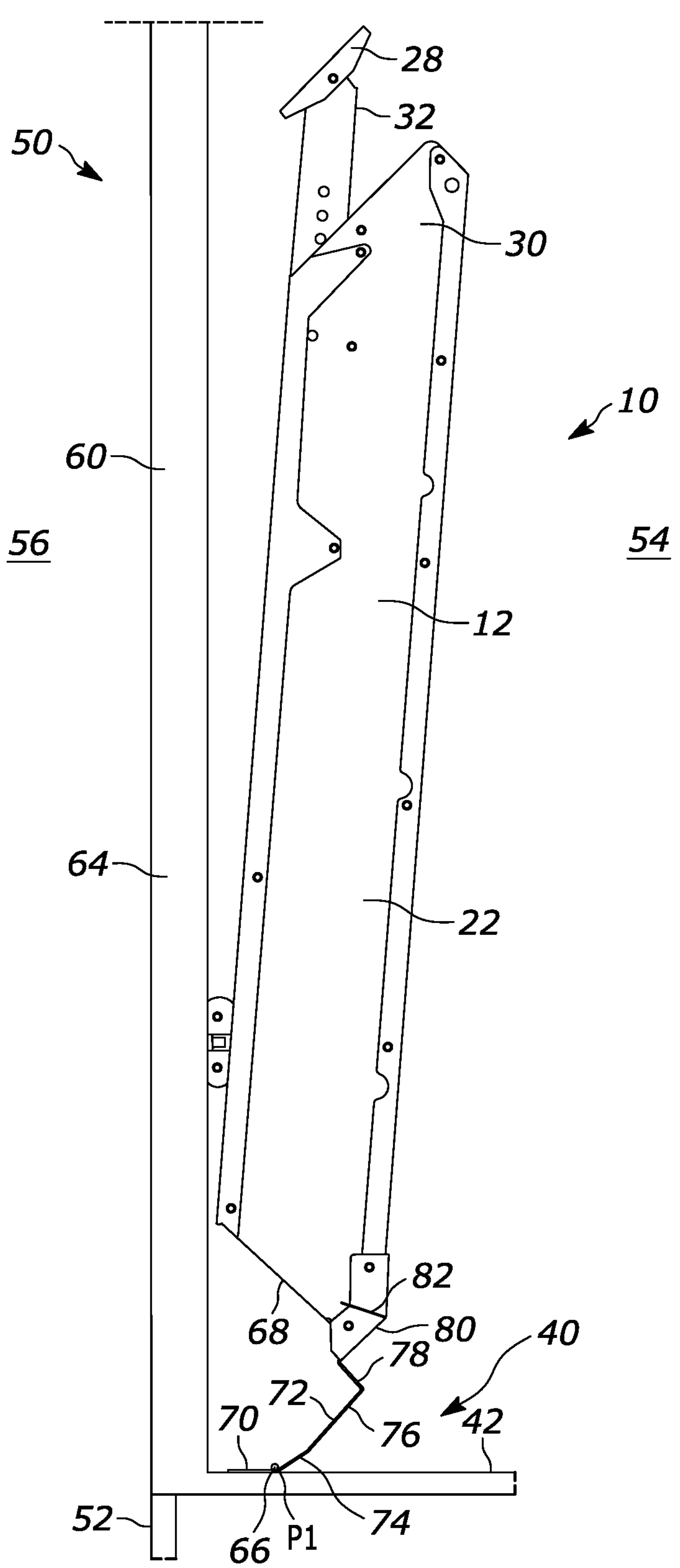
FIG. 3 is a side cross-sectional view of the first pivot connection for a pivoting staircase of FIG. 2 showing the staircase in the storage position.

The pivot connection 40 can take any suitable form. In a first example, as shown in FIGS. 2 and 3, the pivot connection 40 can include a hinge 66 connected to an upper end 68 of the staircase 10 and to the floor 42. The hinge 66 includes a floor mounting portion 70 and a threshold plate 72 that pivots about a pivot axis P1 with respect to the floor mounting portion 70. The floor mounting portion 64 is adapted to be mounted to the floor 42 by any suitable mechanism, including fasteners, welding, adhesive, and so forth. In one example, the floor mounting portion 64 can be mounted on one the side of the door 58 locating it within the indoor space 54. The threshold plate 72 can have a first ramped portion 74 that is adapted to reach upwardly to the distance the threshold 62 rises above the floor 42. The first ramped portion 74 continues into a spanning portion 76 that is adapted to directly overlie the threshold 62 as shown in FIG. 2. The spanning portion 76 continues into an offsetting portion 78 that extends downwardly from the spanning portion 70. The offsetting portion 78 continues into a mounting portion 80 that is mounted adjacent to an upper end 82 of the stringers 12. This may be accomplished by any suitable mechanism, including fasteners, such as bolts, rivets, or screws, driven through the mounting portion 80 or structure extending therefrom.

Figure 4:
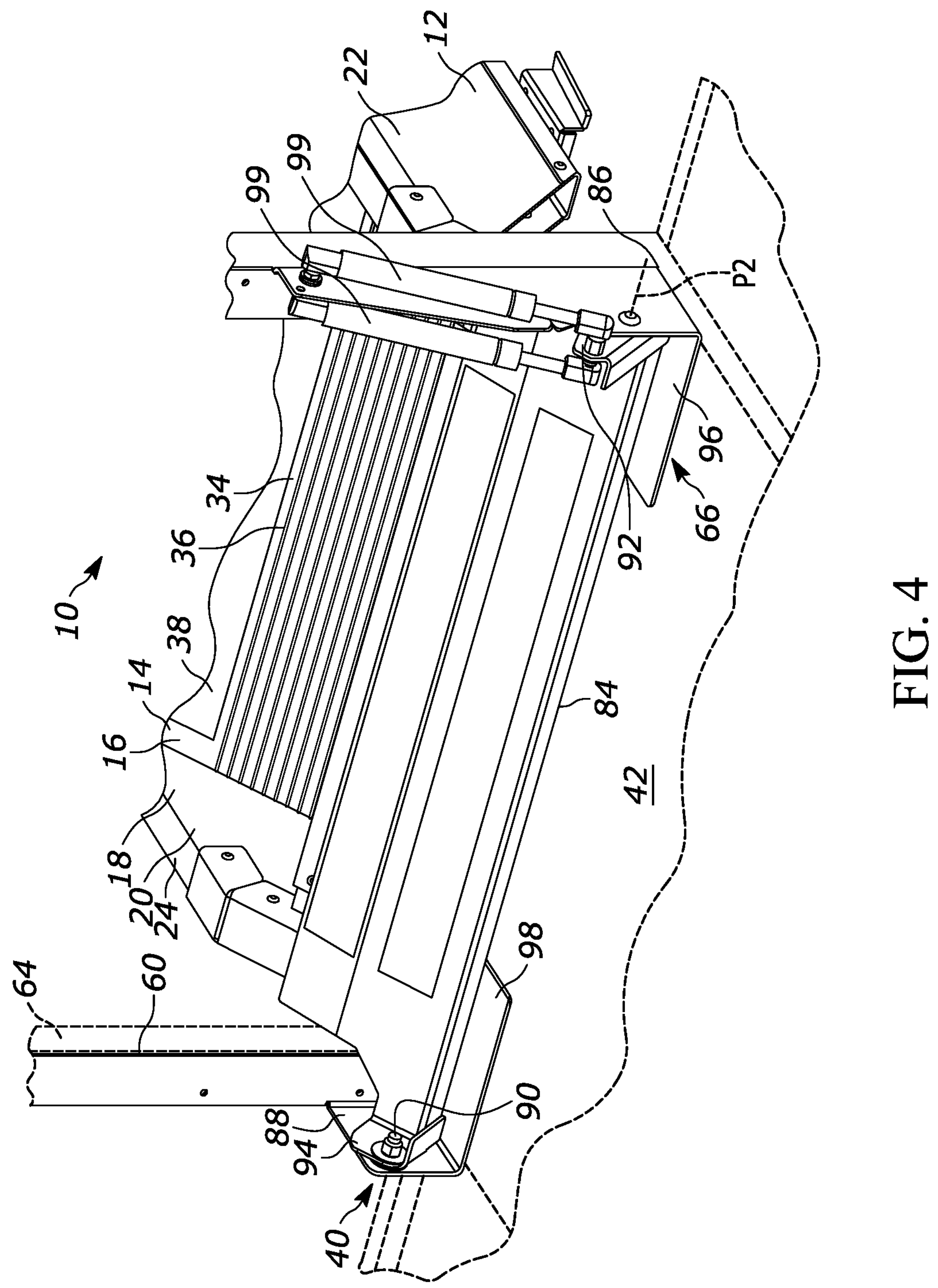
FIG. 4 is a sectional perspective view of a second pivot connection for a pivoting staircase.

In a second example, as shown in FIG. 4, the pivot connection 40 can include a threshold plate 84 having a first hinge flange 86 and a second hinge flange 88. The first and second hinge flanges 86, 88 are positioned such that they extend beyond the door jambs 64. The threshold plate 84 pivots about pivot axis P2 that acts as a hinge for the threshold plate 84 and the pivot axis P2 is defined by the central axis of two fasteners 90 extending through the hinge flanges 86, 88 of the threshold plate 84. The fasteners 90 also extend through corresponding opposing first and second hinge flanges 92, 94 on first and second mounting brackets 96, 98 that are affixed within the indoor space 54. The first and second mounting brackets 96, 98 cooperate with the threshold plate 84 to function as a hinge that pivots about the pivot axis P2. The mounting brackets 96, 98 can have corresponding wall and/or floor mounting flanges for fastening the mounting brackets 96, 98 to the floor 42 and/or wall 52.

The threshold plate 84 spans across the threshold 62 to the outdoor space 56 and is joined to the stringers 12 near the upper ends 82 of the stringers 12. The pivot axis P2 extends through both hinge flanges 92, 94 so that the threshold plate 84 can pivot with respect to the door frame 60 and the pivot axis P2 is fixed with respect to the door frame 60. The hinge flanges 92, 94 of the threshold plate 84 pivotally ride between the mounting brackets 96, 98 and because the hinge flanges 92, 94 of the threshold plate 84 pivot between the mounting brackets 96, 98, the threshold plate 84 is restrained from axial movement while allowing it to pivot about the pivot axis P2. All of the mounting of the staircase 10 via the mounting brackets 96, 98 is done within the indoor space 54 of the vehicle 48. If desired, a pair of gas springs 99 can be connected between the mounting brackets 96, 98 and the hinge flanges 92, 94 of the threshold plate 84 to aid a user in pivoting the staircase 10 between the use and storage positions.

The working parts of the staircase 10 are designed to allow operation of the door 58 when the staircase 10 is in either its use or storage position. With the door 58 open, and with the door 58 remaining open, the staircase 10 may be moved to its use position. Once the staircase 10 is in its use position, the door 58 may be closed over the threshold plate 72, 84. With the staircase 10 in its storage position and the door 58 in its closed position, the entire staircase 10 and pivot connection 40 located within the indoor space 54.

As discussed above, as the staircase 10 is pivoted to the vertical orientation, dirt and other debris captured between the ribs 36 can undesirably fall onto the floor 42. Moreover, the lateral orientation of the ribs 36 prevents a user from being able to easily sweep the treads 14 clean before pivoting.

The present disclosure solves this problem by providing one or more cleaning openings 100 defined at least partially by a lateral edge 102 of the tread 14 and a surface portion 104 of the stringer 12 to provide a pathway 106 for dirt and other debris to fall downwardly off of the tread 14 when the tread 14 is swept, particularly laterally between the ribs 36. As shown, the cleaning openings 100 are disposed between pairs of adjacent connection points 107, e.g., welded or fastener locations, of the tread and the stringer 12. The cleaning openings 100 allow the treads 14 to be cleaned of debris before the staircase 10 is pivoted to the storage position, thereby reducing or preventing debris from falling onto the floor 42. The cleaning openings 100 can take any desired form, some examples of which are shown in FIGS. 3-23.

Figure 5:
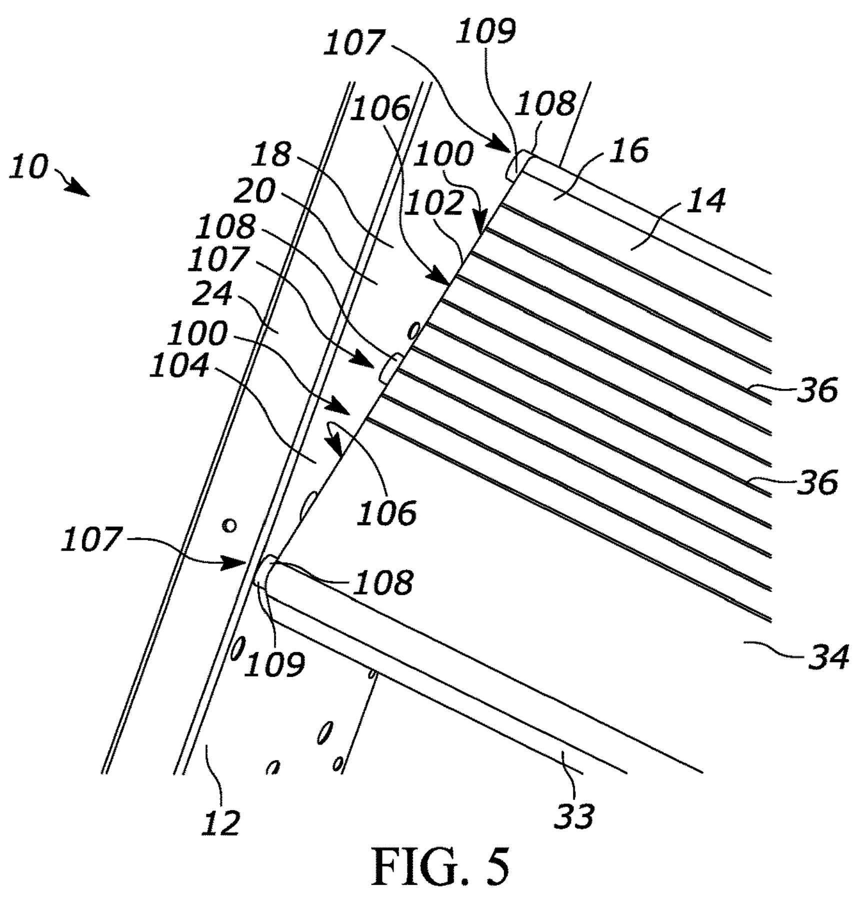
FIG. 5 is a sectional top perspective view of a first example cleaning opening for a pivoting staircase defined between a stringer and tread thereof.
Figure 6:
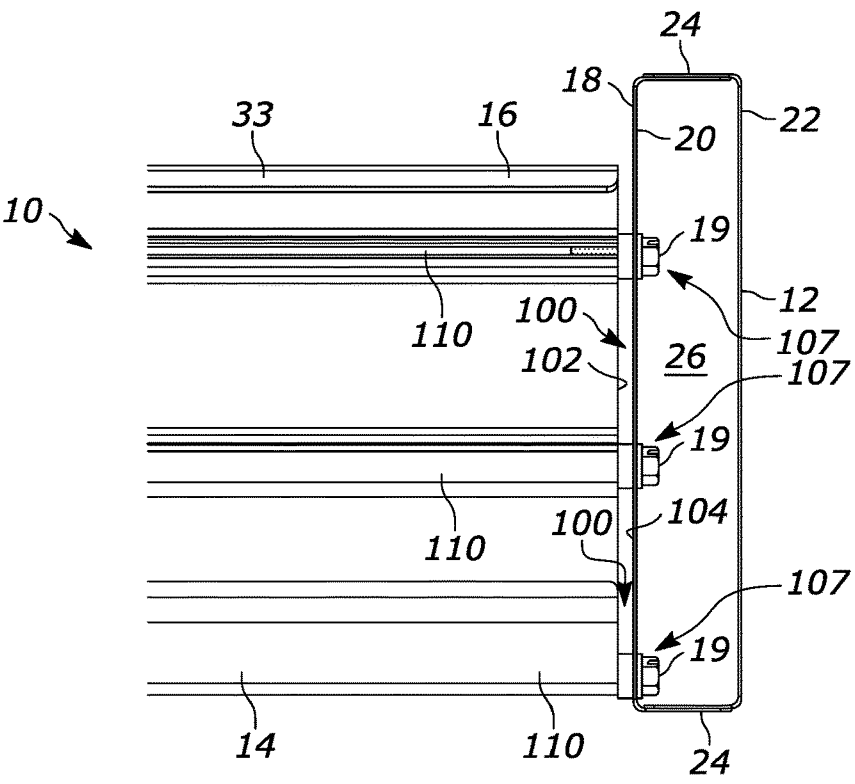
FIG. 6 is a sectional bottom perspective view of the cleaning opening of FIG. 5.

In a first implementation, as shown in FIGS. 5 and 6, the cleaning openings 100 are further defined by members spacing the lateral edge 102 of the tread 14 from the surface portion 104 of the stringer 14, which in the illustrated form are a plurality of spacers 108. The spacers 108 are disposed between the tread lateral end 16 and the stringer interior wall 20. The spacers 108 create the cleaning opening(s) 100 between a lateral edge 102 of the treads 14, the stringer interior surfaces 18, and a sidewall 109 of the spacers 108. In this example, the lateral edge 102 can be planar, as shown.

The spacers 108 correspond to connection points 107 between the treads 14 and the stringers 12, such as fasteners 19 and/or welding locations. For example, the fasteners 19 can extend through the spacers 108 to secure the treads 14 to the stringers 12 or the spacers 108 can be welded to the stringers 12 and treads 14. It will be understood that implementations utilizing fasteners 19 to secure the treads 14 and stringers 12 together can have any desired securing configuration. In one example, as shown in FIGS. 6, 8, 10, 15, 17, 20, and 22, the tread 14 can define channels 110 that are defined by downwardly extending walls. The fasteners 19 can be configured to extend into and deform the walls of the channels 110 to secure thereto. In another example, the fasteners 19 can extend through an opening in a wall of the tread 14 and have a nut tightened thereon.

Any suitable number of spacers 108 can be utilized. For example, there can be two connections between the treads 14 and stringers 12, three connections as shown to impart two cleaning openings 100 on either side of the treads 14, four connections, or more. Further, the spacers 108 can have a cylindrical configuration to provide a rounded surface adjacent to the cleaning openings 100 to minimize dirt or debris that collects thereon while cleaning the treads 14.

Figure 7:
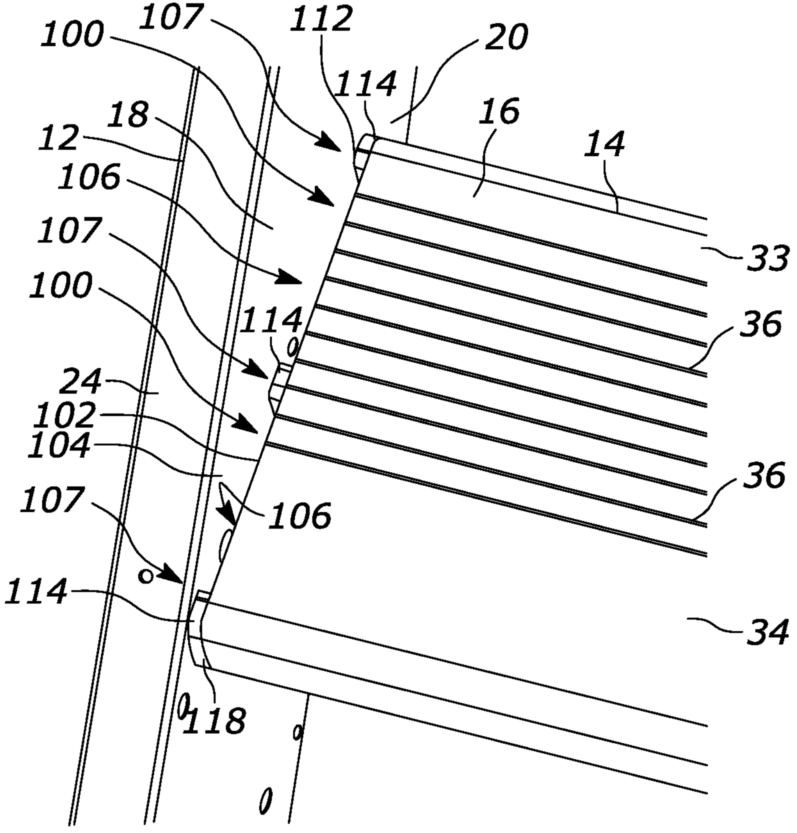
FIG. 7 is a sectional top perspective view of a second example cleaning opening for a pivoting staircase defined between a stringer and tread thereof.
Figure 8:
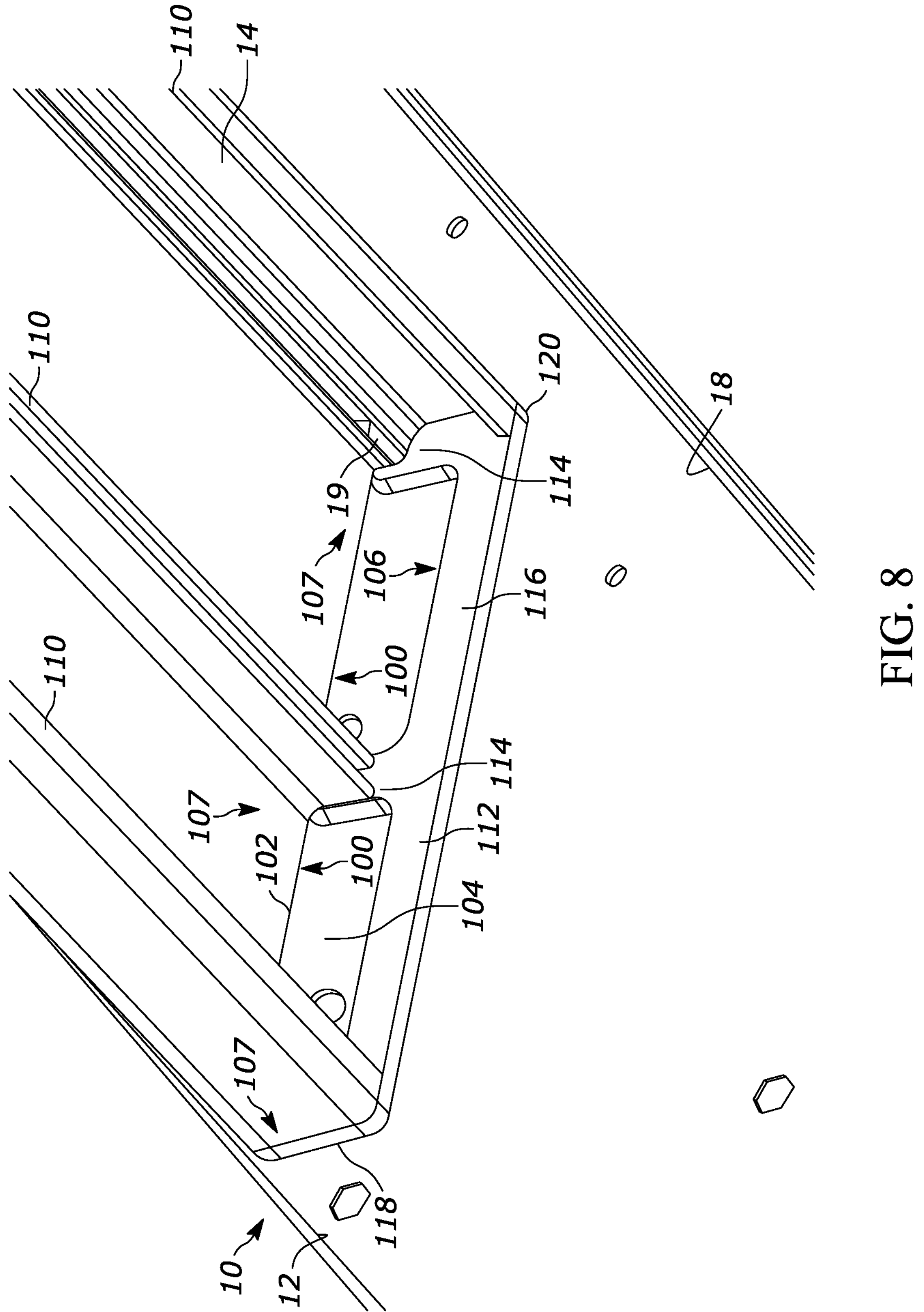
FIG. 8 is a sectional bottom perspective view of the cleaning opening of FIG. 7.

In a second implementation, as shown in FIGS. 7 and 8, the cleaning openings 100 are further defined by members spacing the lateral edge 102 of the tread 14 from the surface portion 104 of the stringer 14, which in the illustrated form are portions of a spacer member 112. The spacer member 112 is disposed between the tread lateral end 16 and the stringer interior wall 20. The spacer member 112 creates the cleaning opening(s) 100 between the lateral edge 102 of the treads 14 and the stringer interior surfaces 18. The spacer member 112 includes fingers 114 that extend outwardly from a base portion 116. As shown, the fingers 114 correspond to connection points 107 between the treads 14 and the stringers 12. While the base portion 116 is shown disposed beneath the tread 14 with the fingers 114 extending upwardly, the base portion 116 could alternatively be disposed above the tread 14 with the fingers 114 extending downwardly. In this example, the lateral edge 102 can be planar, as shown.

As with the above form, any suitable number of fingers 114 can be utilized for a desired number of connection points 107 between the stringers 12 and treads 14. As shown, the fingers 114 can have a rounded upper surface to be disposed adjacent to the cleaning openings 100 to minimize dirt or debris that collects thereon while cleaning the treads 14. Additionally, as shown in FIG. 8, an outer perimeter of the spacer member 112 can correspond to an outer perimeter of the tread 14 to provide an unbroken front and rear edges 118, 120 between the stringers 12 and the treads 14.

Figure 9:
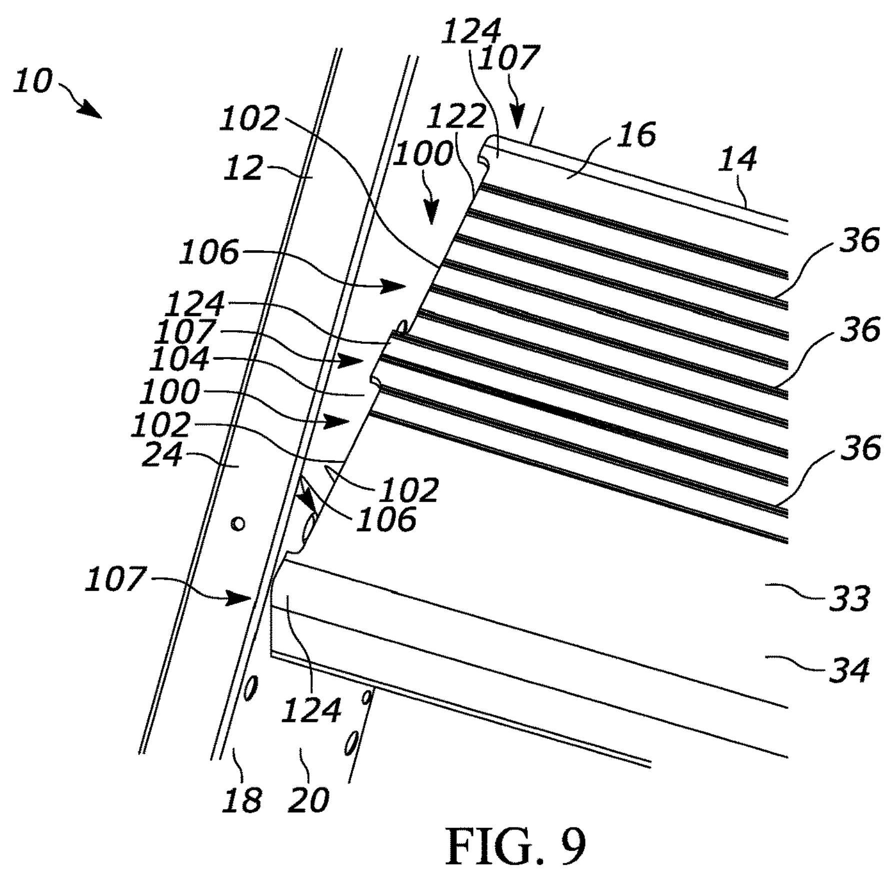
FIG. 9 is a sectional top perspective view of a third example cleaning opening for a pivoting staircase defined between a stringer and tread thereof.
Figure 10:
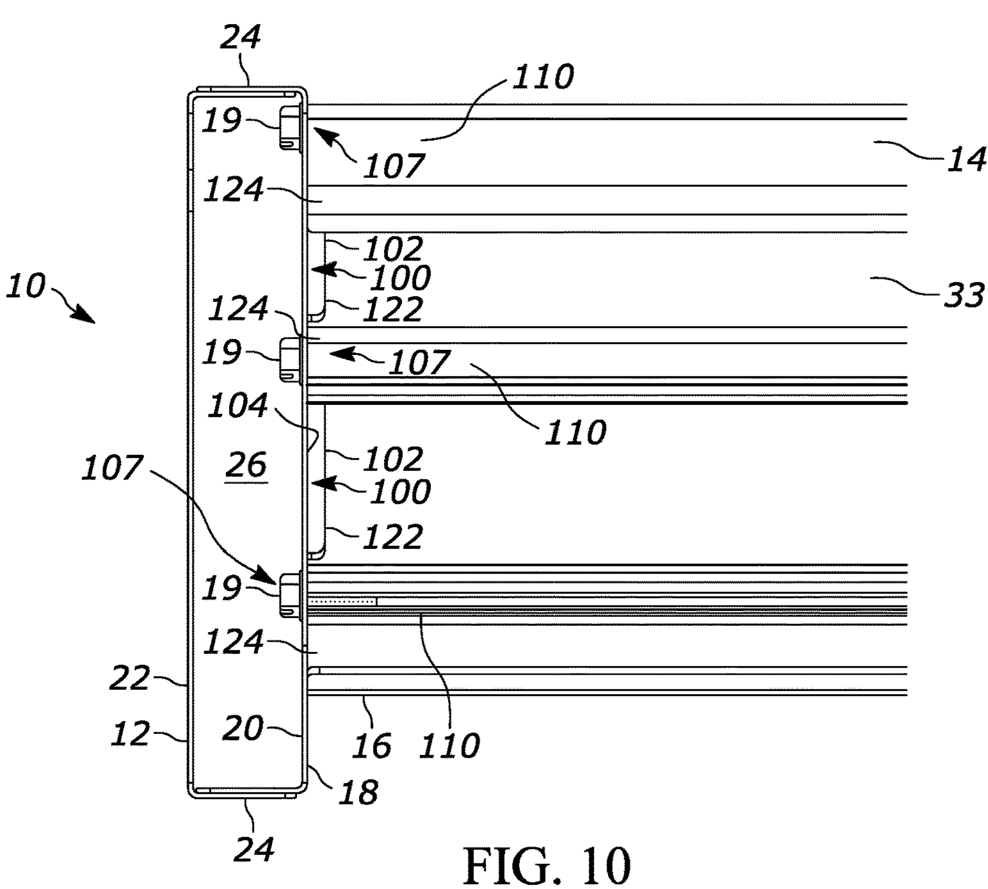
FIG. 10 is a sectional bottom perspective view of the cleaning opening of FIG. 9.

In a third implementation, as shown in FIGS. 9 and 10, the lateral edge 102 of the tread 14 can define one or more cut-out or concave portions 122 disposed between extensions 124 to create the cleaning opening(s) 100 between the lateral edge 102 of the treads 14 and the stringer interior surfaces 18. As shown, the extensions 124 correspond to connection points 107 between the treads 14 and the stringers 12. As with the above examples, any suitable number of extensions 124 can be utilized for a desired number of connection points 107 between the stringers 12 and treads 14.

Figure 11:
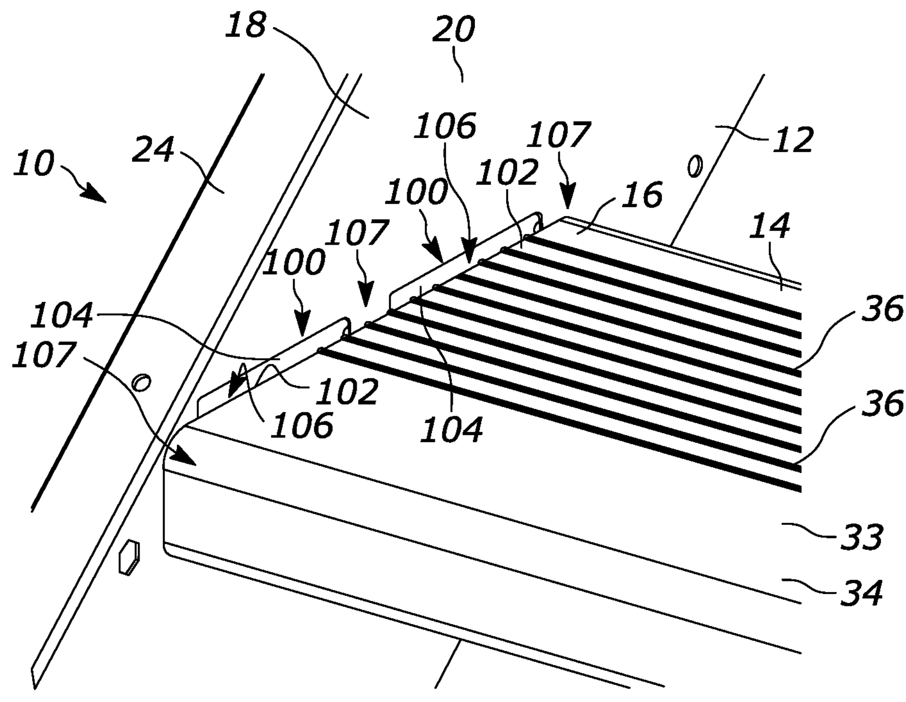
FIG. 11 is a sectional top perspective view of a fourth example cleaning opening for a pivoting staircase defined between a stringer and tread thereof.
Figure 12:
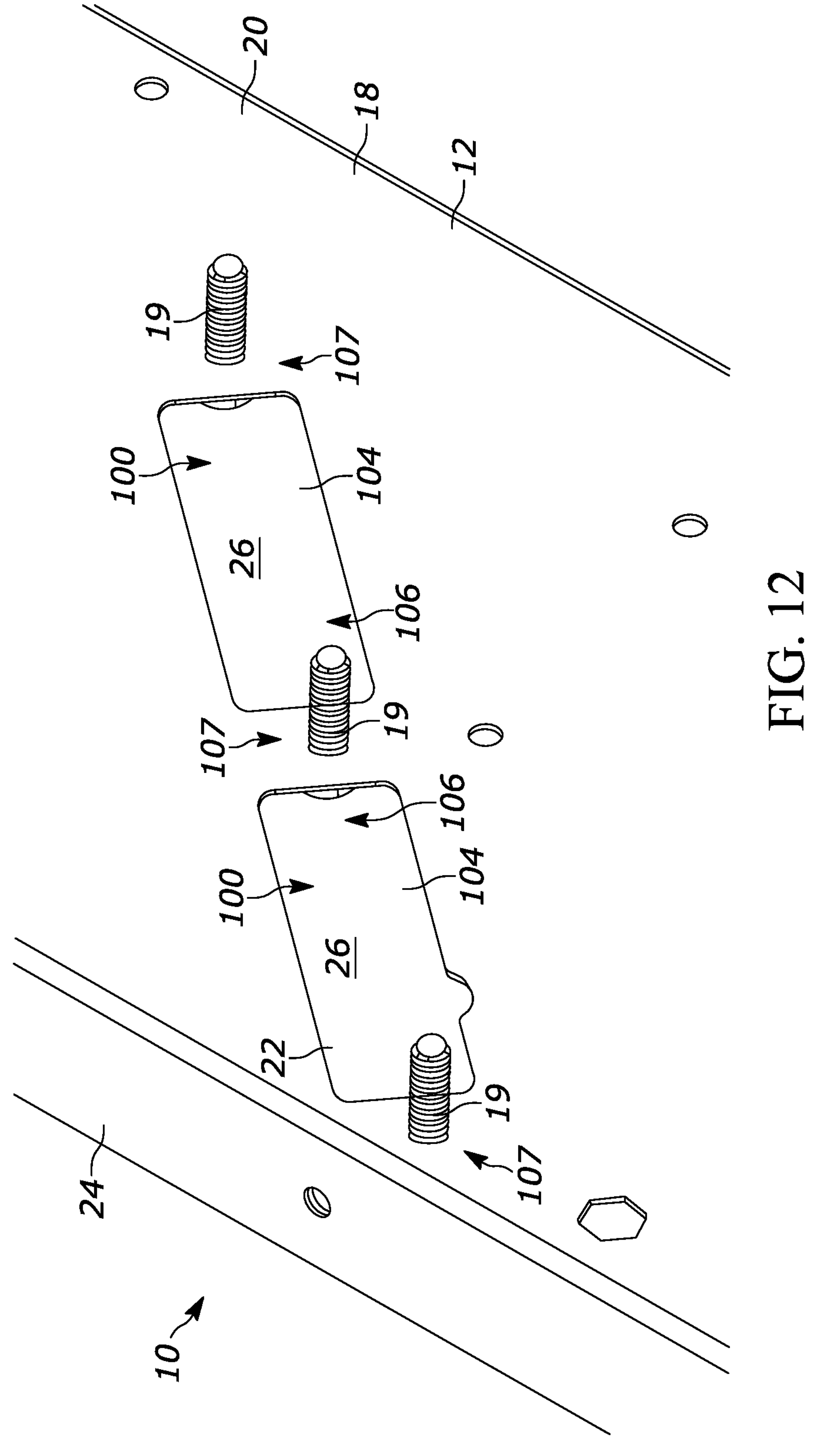
FIG. 12 is a sectional top perspective view of the stringer of FIG. 11 showing openings extending through an interior wall thereof.

In a fourth implementation, as shown in FIGS. 11 and 12, the lateral edge 102 of the tread 14 extends along the interior surface 18 of the stringer 14 and the surface portion 104 of the stringer 14 is spaced laterally away from the lateral edge 102 of the tread 14. In this example, the interior wall 20 of the stringer 12 defines one or more openings 125 extending therethrough, where the openings 125 are aligned with the tread 14 and at least extend above the tread upper surface 34 so that dirt and other debris can be swept through the openings 125 and into the interior 26 of the stringer 12. With this configuration, the surface portion 104 partially defining the cleaning opening(s) 100 is provided by an interior surface of the exterior wall 22. In this example, the lateral edge 102 can be planar, as shown.

As with the above examples, any suitable number of openings 125 can be utilized for a desired number of connection points 107 between the stringers 12 and treads 14, with the openings 125 disposed between the connection points 107. For example, the stringer interior wall 20 can define one opening, two openings 125 as shown, three openings 125, or more.

Figure 13:
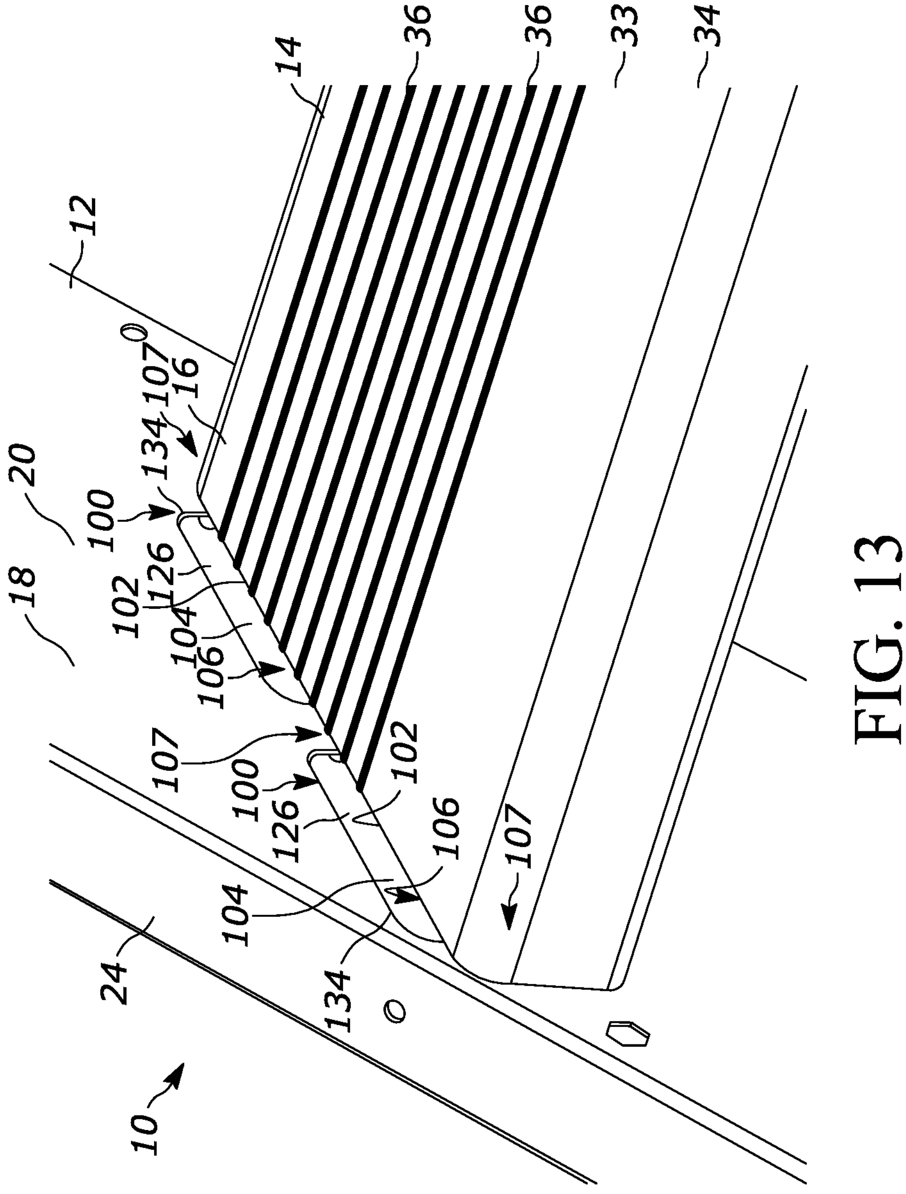
FIG. 13 is a sectional top perspective view of a fifth example cleaning opening for a pivoting staircase defined between a stringer and tread thereof.
Figure 14:
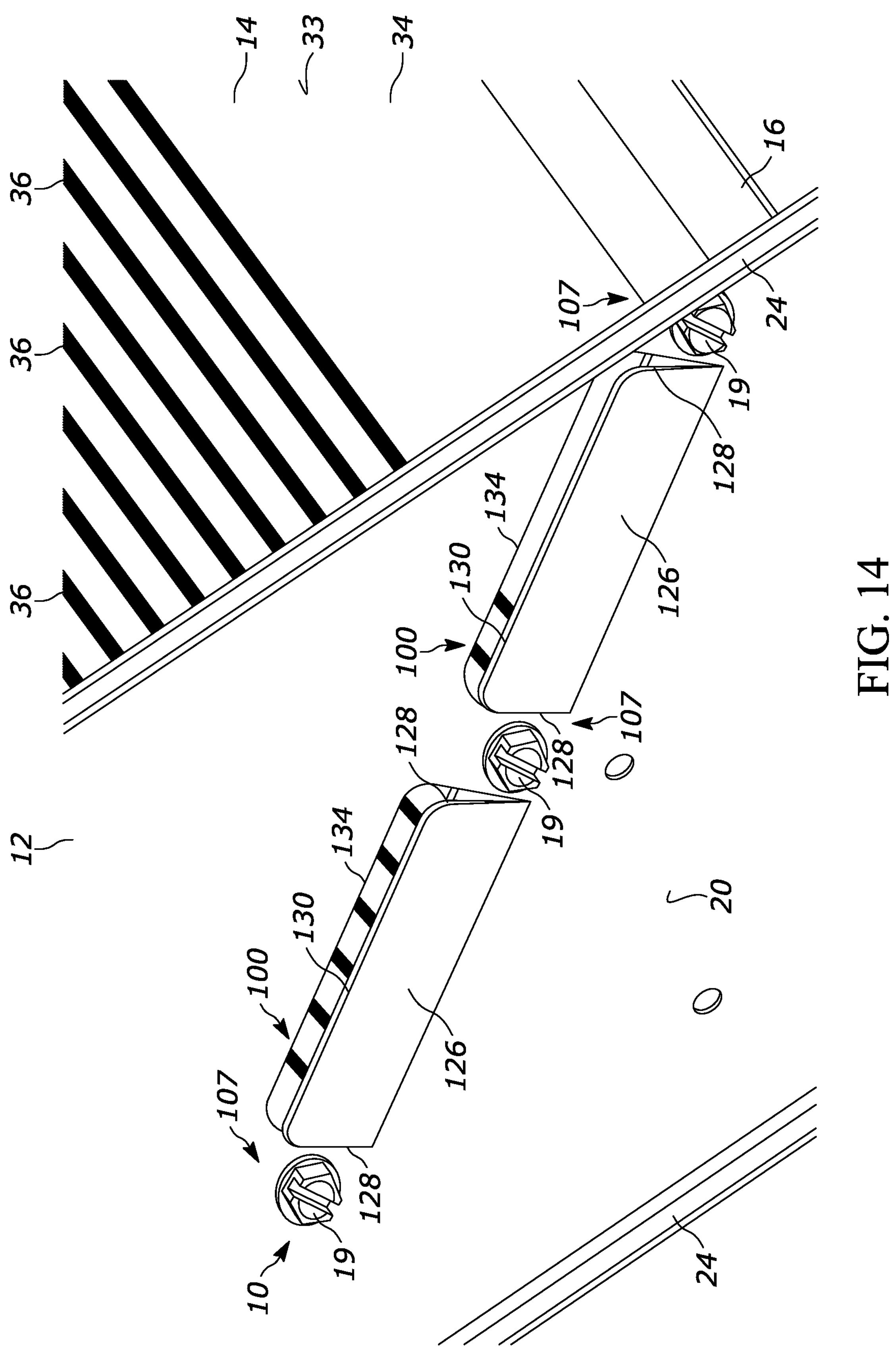
FIG. 14 is a cross-sectional perspective view of the cleaning opening of FIG. 13 showing an interior of the stringer.
Figure 15:
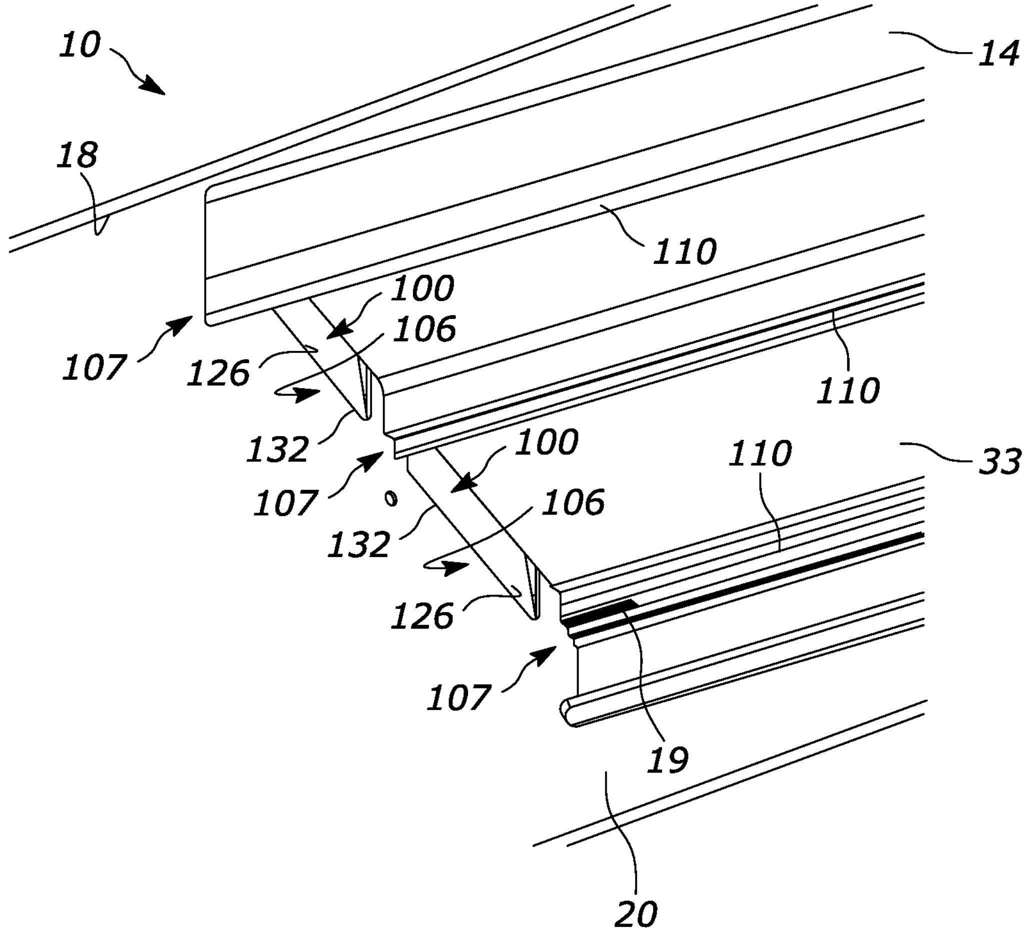
FIG. 15 is a sectional bottom perspective view of the cleaning opening of FIG. 13.

In a fifth implementation, as shown in FIGS. 13-15, the lateral edge 102 of the tread 14 extends along the interior surface 18 of the stringer 14 and the surface portion 104 of the stringer 14 is spaced laterally away from the lateral edge 102 of the tread 14. In this example, the cleaning opening(s) 100 are partially defined by one or more deflectors 126 formed by cuts extending through the interior wall 20 of the stringer 12. As shown, side and top edges 128, 130 of each deflector 126 are cut through the stringer interior wall 20 and the deflector 126 is bent inwardly about a bottom edge 132 thereof to extend into the interior 26 of the stringer 12 and away from the tread 14. The resulting opening 100 defined by an exterior cut edge 134, the deflector 126, and the tread lateral edge 102 is aligned with the tread 14. Further, the exterior cut edge 134 at least extends above the tread upper surface 34 so that dirt and other debris can be swept through the opening(s) 100. The dirt/debris is deposited onto the deflector 126, which then directs it below the tread 14. As with the above examples, any suitable number of deflectors 126, and corresponding openings 100, can be utilized for a desired number of connection points 107 between the stringers 12 and treads 14, with the walls 126/openings 100 disposed between the connection points 107. In this example, the lateral edge 102 can be planar, as shown.

Figure 16:
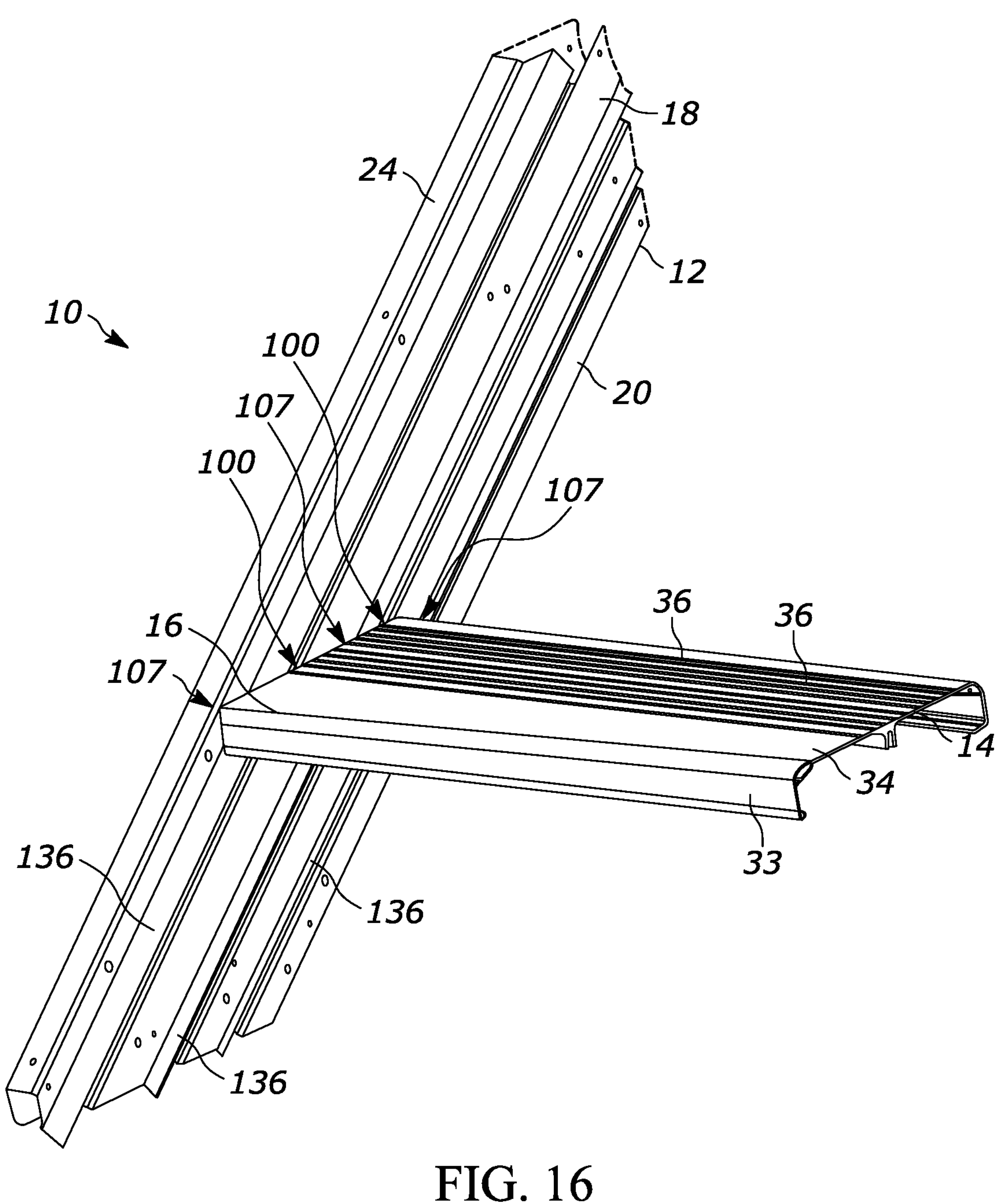
FIG. 16 is a top perspective view of a sixth example cleaning opening for a pivoting staircase defined between a stringer and tread thereof.
Figure 17:
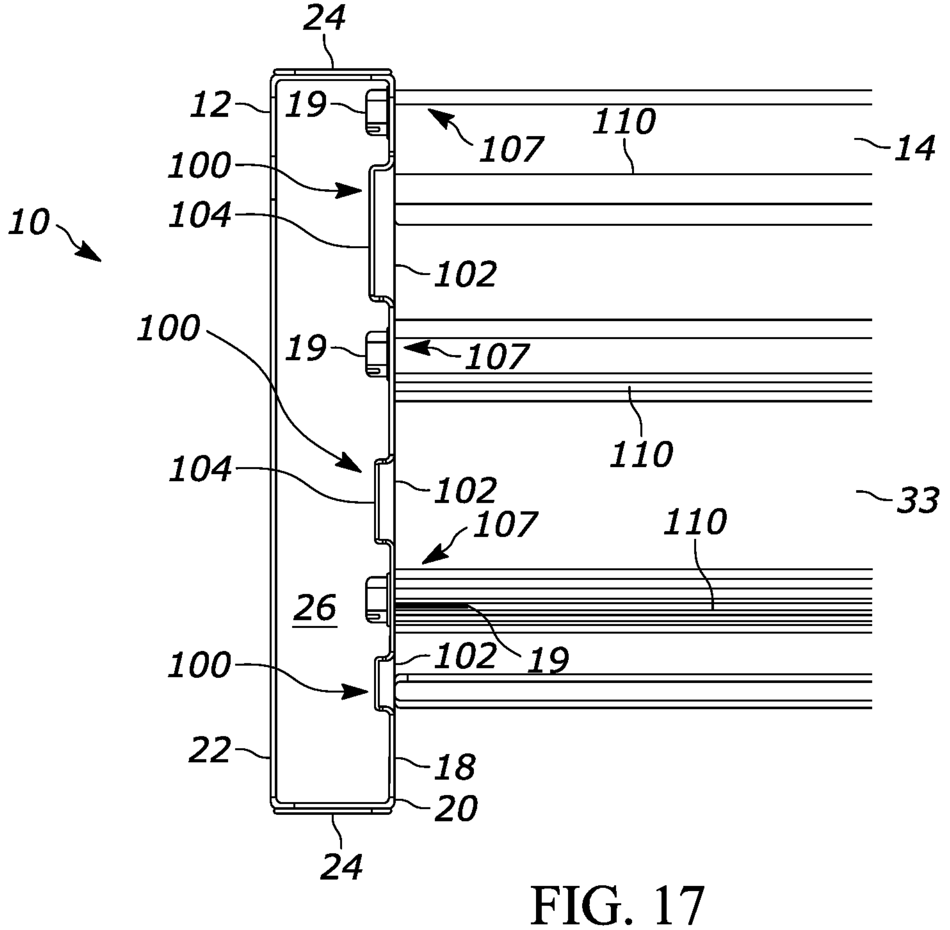
FIG. 17 is a sectional bottom perspective view of the cleaning opening of FIG. 16.

In a sixth implementation, as shown in FIGS. 16 and 17, the lateral edge 102 of the tread 14 extends along the interior surface 18 of the stringer 14 and the surface portion 104 of the stringer 14 is spaced laterally away from the lateral edge 102 of the tread 14. In this example, the stringer 14 can have a ribbed configuration with grooves 136 formed in the interior wall 20 thereof that extend the longitudinal length of the stringer 14. The grooves 136 extend past the tread lateral edge 102 to create the cleaning opening(s) 100 between the lateral edge 102 and the stringer interior surface 18 recessed within the grooves 136. With this configuration, dirt and other debris can be swept through the opening(s) 100 to be deposited within the grooves 136, which open at a distal end 30 of the stringers 12 to deposit the dirt/debris on the ground 44. The grooves 136 can have any desired configuration. For example, the grooves 136 can have a rectangular horizontal cross-section as shown or other concave configurations. In one example, the interior wall 20 can be extruded or rolled to create the grooves 136 along the length thereof. A width of the grooves 136 can correspond to a distance between the connection points 107 between the stringers 12 and treads 14. As with the above examples, any suitable number of grooves 136, and corresponding openings 100, can be utilized for a desired number of connection points 107 between the stringers 12 and treads 14. In this example, the lateral edge 102 can be planar, as shown.

Figure 18:
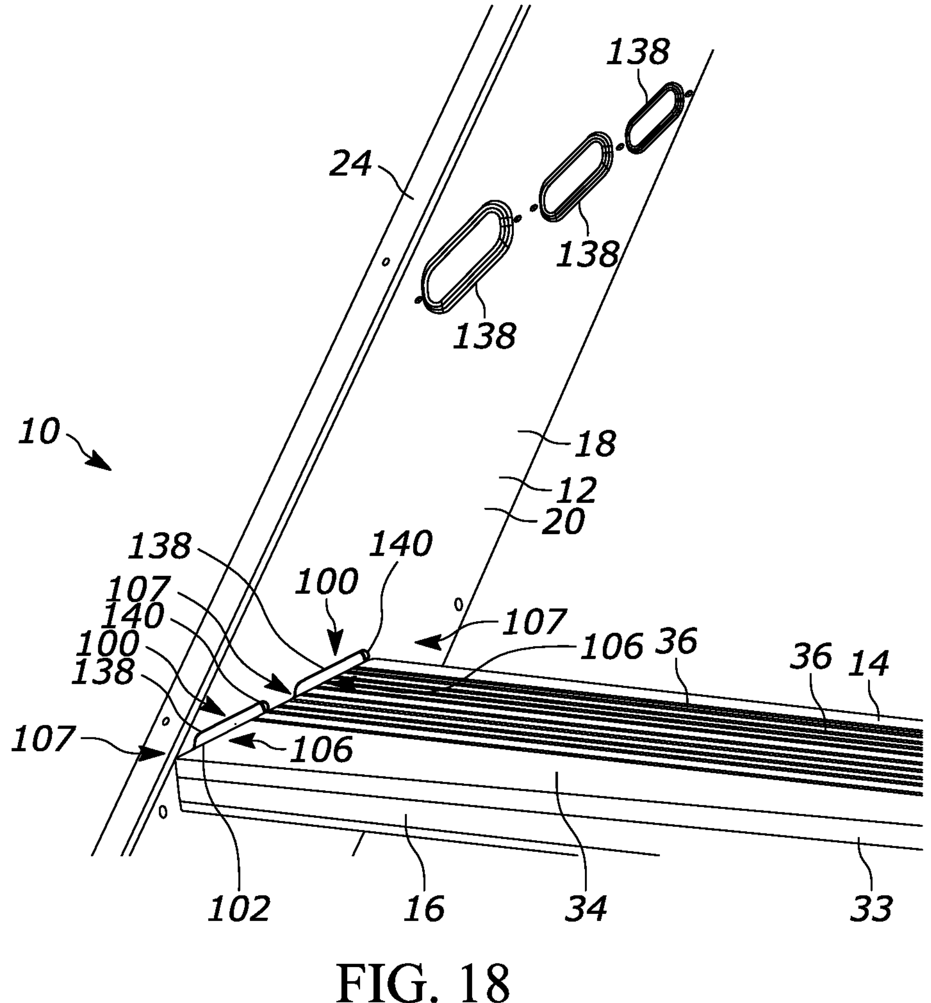
FIG. 18 is a sectional perspective view of a seventh example cleaning opening for a pivoting staircase defined between a stringer and tread thereof.
Figures 19, 20:
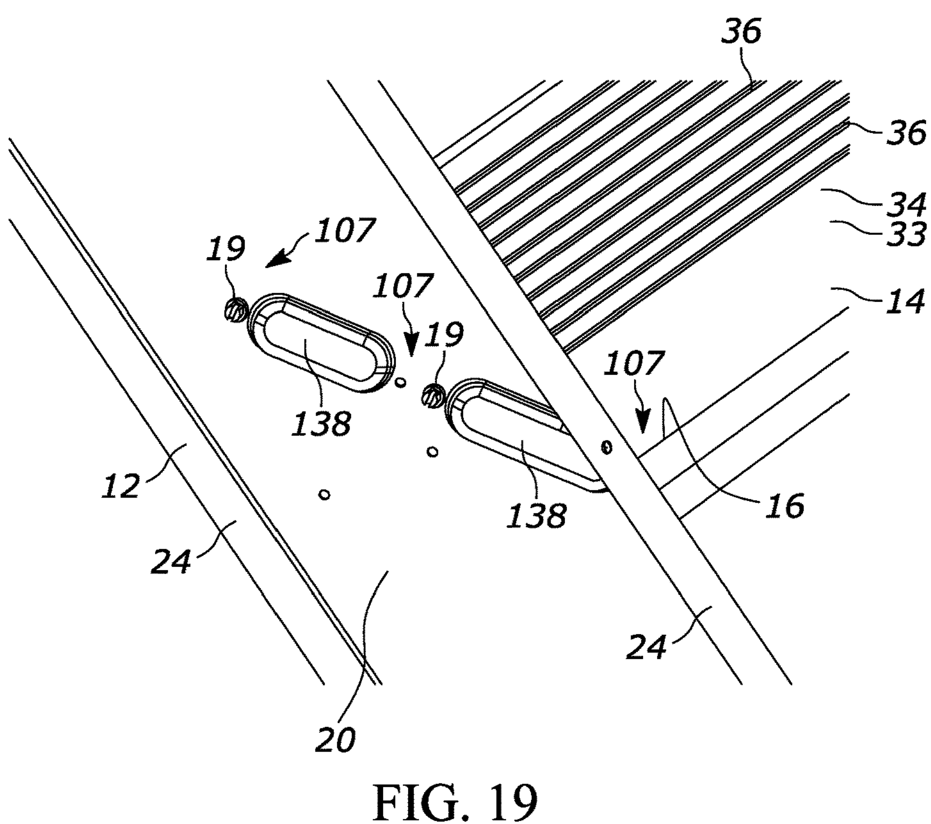
FIG. 19 is a cross-sectional perspective view of the cleaning opening of FIG. 18 showing an interior of the stringer.
FIG. 20 is a sectional bottom perspective view of the cleaning opening of FIG. 18.

In a seventh implementation, as shown in FIGS. 18-20, the lateral edge 102 of the tread 14 extends along the interior surface 18 of the stringer 14 and the surface portion 104 of the stringer 14 is spaced laterally away from the lateral edge 102 of the tread 14. In this example, the interior wall 20 of the stringer 12 includes one or more cavities 138 defined in the interior surface 18 thereof. For example, the cavities 138 can be embossed into the interior wall 20. In this form, the cleaning opening(s) 100 are defined by an interior surface 140 of the cavities 138. The cavities 138 are formed in the interior wall 20 such that the opening(s) 100 are aligned with the tread 14 and the cavities 138 at least extend above the tread upper surface 34 so that dirt and other debris can be swept through the opening(s) 100 and into the cavities 138, which subsequently direct the dirt/debris back out underneath the tread 14. The cavities 138 can have a rounded configuration such that a lower surface 142 thereof is angled to direct dirt/debris below the tread 14. Additionally, a vertical cross-section of the cavities 138 can be track-shaped as shown, or can be oval, circular, rectangular, and so forth. As with the above examples, any suitable number of openings 100 can be utilized for a desired number of connection points 107 between the stringers 12 and treads 14, with the openings 100 disposed between the connection points 107. For example, the stringer interior wall 20 can define one opening, two openings 100 as shown aligned with the tread 14, three openings as shown at a top of the stringer 12, or more. In this example, the lateral edge 102 can be planar, as shown.

Figure 21:
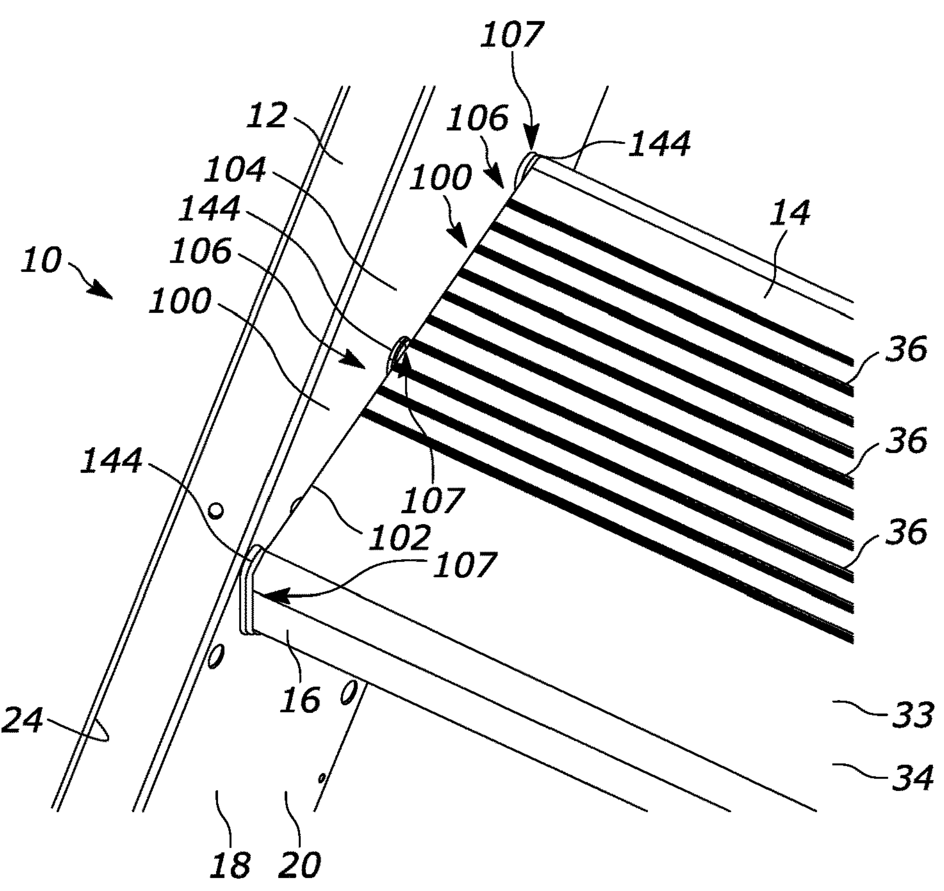
FIG. 21 is a sectional top perspective view of an eighth example cleaning opening for a pivoting staircase defined between a stringer and tread thereof.
Figure 22:
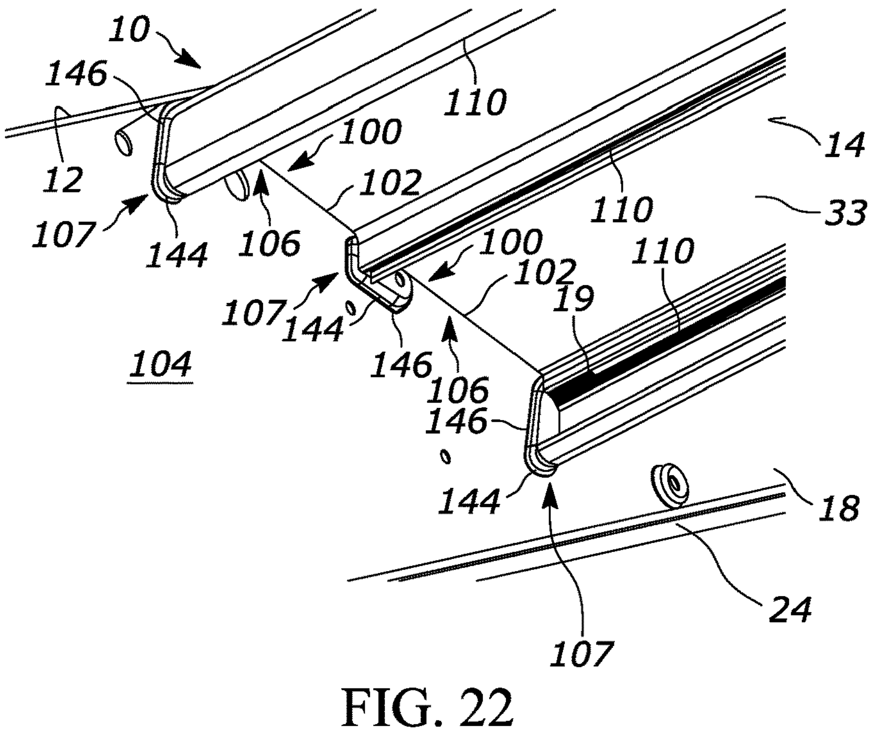
FIG. 22 is a sectional bottom perspective view of the cleaning opening of FIG. 21.
Figure 23:
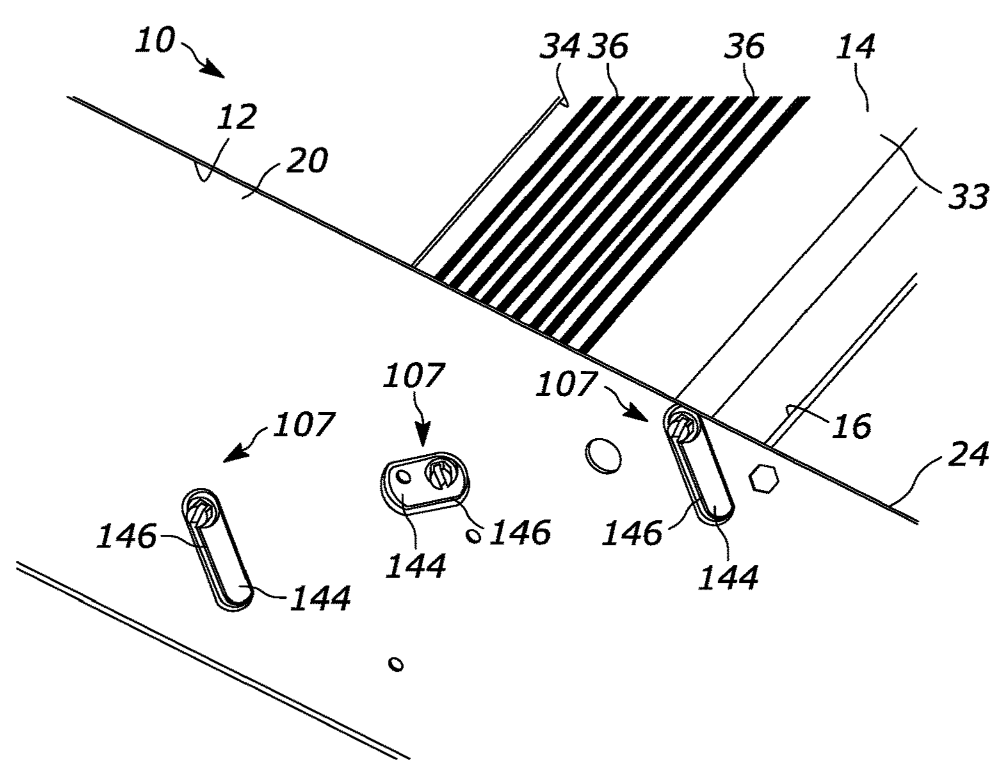
FIG. 23 is a cross-sectional perspective view of the cleaning opening of FIG. 21 showing an interior of the stringer.

In an eighth implementation, as shown in FIGS. 21-23, the cleaning openings 100 are further defined by members spacing the lateral edge 102 of the tread 14 from the surface portion 104 of the stringer 14, which in the illustrated form are one or more protrusions 144 extending from the interior surface 18 of the stringer 12. For example, the protrusions 144 can be embossed into the interior wall 20. In this form, the protrusions 144 create the cleaning opening(s) 100 between the lateral edge 102 of the treads 14, the stringer interior surfaces 18 adjacent to the projections 144, and a side wall 146 of the protrusions 144. The protrusions 144 correspond to connection points 107 between the treads 14 and the stringers 12, such as fasteners 19 and/or welding locations as discussed above. Any suitable number of protrusions 144 can be utilized. For example, there can be two connections between the treads 14 and stringers 12, three connections as shown to impart two cleaning openings 100, four connections, or more. Further, the protrusions 144 can have a rounded upper surface adjacent to the cleaning openings 100 to minimize dirt or debris that collects thereon while cleaning the treads 14. Additionally, a vertical cross-section of the protrusions 144 can be track-shaped as shown, or can be oval, circular, rectangular, and so forth. If desired, portions of perimeter of the protrusions 144 can be complementary to a corresponding portion of a perimeter of the tread lateral end 16. As with the above examples, any suitable number of protrusions 144 can be utilized for a desired number of connection points 107 between the stringers 12 and treads 14, with the openings 100 disposed between the connection points 107. In this example, the lateral edge 102 can be planar, as shown.

In a ninth implementation, as shown in FIGS. 24 and 25, the lateral edge 102 of the tread 14 extends along the interior surface 18 of the stringer 12 and the surface portion 104 of the stringer 12 is spaced laterally away from the lateral edge 102 of the tread 14. In this example, the interior wall 20 of the stringer 12 includes top and bottom portions 20*a*, 20*b* separated by a gap 20*c* extending a longitudinal length of the stringer 12. Stated another way, the top and bottom portions 20*a*, 20*b* can be top and bottom flanges extending toward one another from the opposite sidewalls 24 of the stringer 12. The tread 14 of this form is coupled to the top and bottom portions 20*a*, 20*b* with the lateral edge 102 of the tread extending along the interior surfaces 18 thereof. In this example, an interior span 14*a* of the tread 14 is aligned with the gap 20*c*. With this configuration, the surface portion 104 partially defining the cleaning opening(s) 100 is provided by an interior surface of the exterior wall 22. With this configuration, dirt and other debris can be swept through the gap 20*c* and into the interior 26 of the stringer 12. A width of the gap 20*c* can correspond to a distance between the connection points 107 between the stringers 12 and treads 14. In this example, the lateral edge 102 can be planar, as shown.

Although one stringer/tread connection is described for each example cleaning opening 100 with reference to FIGS. 5-25, it will be understood that the opposite lateral end 16 of the tread 14 and the other stringer 12 can have a mirrored configuration with similar, opposite cleaning opening(s) 100. Moreover, additional treads 14 on the staircase 10 can be configured the same or similarly to the above-described tread 14, i.e., can have cleaning opening(s) 100 on one or both lateral ends 16 thereof. In some instances, a top tread 14 on the staircase 10 can have an expanded depth relative to other treads 14. In these instances, the tread 14 can have additional cleaning opening(s) 100 as described herein or can have cleaning opening(s) 100 with expanded dimensions.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

The terms “substantially,” “approximately,” and “about” used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein It will be appreciated that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. The same reference numbers may be used to describe like or similar parts. Further, while several examples have been disclosed herein, any features from any examples may be combined with or replaced by other features from other examples. Moreover, while several examples have been disclosed herein, changes may be made to the disclosed examples within departing from the scope of the claims.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A pivoting staircase comprising:

a pair of stringers, each of the pair of stringers comprising an upper edge, a lower edge, and an interior wall extending between the upper edge and the lower edge;

a tread extending between the stringers, lateral edges of the tread extending along the interior walls of the pair of stringers between the upper edges and the lower edges thereof, an upper surface of the tread having upstanding ribs extending laterally thereacross; and a cleaning opening defined at least partially by the lateral edge of the tread and a surface portion of the interior wall of an adjacent one of the pair of stringers, the cleaning opening disposed between a pair of adjacent connection points of the tread and the adjacent one of the pair of stringers to provide a pathway for debris to fall laterally off of the upper surface of the tread.

2. The pivoting staircase of claim 1, wherein the cleaning opening is further defined by members spacing the lateral edge of the tread from the surface portion of the adjacent one of the pair of stringers partially defining the cleaning opening.

3. The pivoting staircase of claim 2, wherein the members comprise spacers disposed between the tread and the adjacent one of the pair of stringers; and the tread is secured to the pair of stringers by fasteners at the connection points, the fasteners configured to extend through the spacers.

4. The pivoting staircase of claim 2, further comprising a spacer member disposed between the tread and the adjacent one of the pair of stringers, wherein the members comprise fingers of the spacer member extending from a base portion thereof.

5. The pivoting staircase of claim 2, wherein the members comprise protruding portions of the adjacent one of the pair of stringers.

6. The pivoting staircase of claim 5, wherein the protruding portions are embossed portions of a wall of the adjacent one of the pair of stringers.

7. The pivoting staircase of claim 2, wherein the members have a rounded upper surface.

8. The pivoting staircase of claim 2, wherein the lateral edge of the tread is planar.

9. The pivoting staircase of claim 1, wherein the lateral edge of the tread comprises extension portions and a concave portion disposed therebetween, the extension portions being at the connection points between the tread and the adjacent one of the pair of stringers.

10. The pivoting staircase of claim 1, wherein the lateral edge of the tread extends along an interior surface of the adjacent one of the pair of stringers; and the surface portion of the adjacent one of the pair of stringers partially defining the cleaning opening is spaced laterally away from the lateral edge of the tread.

11. The pivoting staircase of claim 10, wherein the adjacent one of the pair of stringers comprises a tubular body having the interior wall and an exterior wall, the interior wall defining an opening extending therethrough aligned with the tread and extending above a top surface thereof, and the surface portion of the adjacent one of the pair of stringers partially defining the cleaning opening comprises a surface of the exterior wall.

12. The pivoting staircase of claim 10, wherein the adjacent one of the pair of stringers comprises a tubular body having the interior wall, an exterior wall, and sidewalls extending between, the interior wall comprising top and bottom portions extending from the sidewalls with a gap disposed therebetween aligned with the tread, and the surface portion of the adjacent one of the pair of stringers partially defining the cleaning opening comprises a surface of the exterior wall.

13. A pivoting staircase comprising:

a pair of stringers;

a tread extending between the stringers, an upper surface of the tread having upstanding ribs extending laterally thereacross; and a cleaning opening defined at least partially by a lateral edge of the tread and a surface portion of an adjacent one of the pair of stringers, the cleaning opening disposed between a pair of adjacent connection points of the tread and the adjacent one of the pair of stringers to provide a pathway for debris to fall laterally off of the upper surface of the tread;

wherein the lateral edge of the tread extends along an interior surface of the adjacent one of the pair of stringers; and the surface portion of the adjacent one of the pair of stringers partially defining the cleaning opening is spaced laterally away from the lateral edge of the tread;

wherein the adjacent one of the pair of stringers comprises a wall having the interior surface, the surface portion of the adjacent one of the pair of stringers partially defining the cleaning opening comprising a surface of a cavity formed in the wall.

14. The pivoting staircase of claim 13, wherein the cavity is embossed within the wall.

15. The pivoting staircase of claim 10, wherein the adjacent one of the pair of stringers comprises the interior wall having the interior surface, the surface portion of the adjacent one of the pair of stringers partially defining the cleaning opening being provided by a deflector of the interior wall, the deflector having side and top edges defined by cuts extending through the interior wall and being pivoted about a bottom edge thereof to extend away from the tread.

16. The pivoting staircase of claim 10, wherein the adjacent one of the pair of stringers comprises the interior wall having the interior surface, the surface portion of the adjacent one of the pair of stringers partially defining the cleaning opening comprising a surface of a groove formed in the interior wall and extending a length of the adjacent one of the pair of stringers.

17. A pivoting staircase comprising a pair of stringers;

a tread extending between the stringers, an upper surface of the tread having upstanding ribs extending laterally thereacross;

a cleaning opening defined at least partially by a lateral edge of the tread and a surface portion of an adjacent one of the pair of stringers, the cleaning opening disposed between a pair of adjacent connection points of the tread and the adjacent one of the pair of stringers to provide a pathway for debris to fall laterally off of the upper surface of the tread; and a second cleaning opening defined at least partially by the lateral edge of the tread and a second surface portion of the adjacent one of the pair of stringers, the second cleaning opening disposed between a second pair of adjacent connection points of the tread and the adjacent one of the pair of stringers to provide a pathway for debris to fall laterally off of the tread.

18. The pivoting staircase of claim 1, further comprising a pivot connection coupled to upper ends of the pair of stringers, the pivot connection configured to pivotably mount the pivoting staircase to an elevated surface.

19. The pivoting staircase of claim 18, wherein the pivot connection comprises:

a hinge having a floor mounting portion and a mounting plate pivotably connected to the floor mounting portion, the mounting plate coupled to the upper ends of the pair of stringers; or left and right hinges including first hinge flanges coupled to the upper edges of the pair of stringers and second hinge flanges including at least one of a floor mounting portion or a wall mounting portion.

20. The pivoting staircase of claim 1, further comprising an opposite cleaning opening defined at least partially by an opposite lateral edge of the tread and a surface portion of the other one the pair of stringers, the opposite cleaning opening having a mirror configuration to the cleaning opening.

* * * * *